United States Patent
An et al.

(10) Patent No.: US 10,978,067 B2
(45) Date of Patent: Apr. 13, 2021

(54) HOME APPLIANCE, CONTROL SYSTEM BY VOICE RECOGNITION AND OPERATING METHOD OF THE SAME

(71) Applicant: LG ELECTRONICS INC., Seoul (KR)

(72) Inventors: Junhee An, Seoul (KR); Hyojeong Kang, Seoul (KR); Jaehoon Lee, Seoul (KR); Heungkyu Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 102 days.

(21) Appl. No.: 16/242,770

(22) Filed: Jan. 8, 2019

(65) Prior Publication Data

US 2019/0214009 A1  Jul. 11, 2019

(30) Foreign Application Priority Data

Jan. 8, 2018 (KR) .......................... 10-2018-0002475

(51) Int. Cl.

| | |
|---|---|
| *G10L 15/22* | (2006.01) |
| *G06F 3/16* | (2006.01) |
| *D06F 39/00* | (2020.01) |
| *H04L 12/28* | (2006.01) |
| *H04L 12/46* | (2006.01) |

(52) U.S. Cl.
CPC .............. *G10L 15/22* (2013.01); *D06F 39/00* (2013.01); *G06F 3/167* (2013.01); *H04L 12/282* (2013.01); *H04L 12/4625* (2013.01); *G10L 2015/223* (2013.01); *H04L 2012/285* (2013.01)

(58) Field of Classification Search
CPC .............. G10L 15/22; G10L 2015/225; G10L 2015/223; G10L 15/28; G10L 15/30
See application file for complete search history.

(56) References Cited

U.S. PATENT DOCUMENTS

| | | | | |
|---|---|---|---|---|
| 7,308,408 | B1* | 12/2007 | Stifelman | ............... G10L 15/22 |
| | | | | 704/266 |
| 9,947,317 | B2* | 4/2018 | Kibre | .................... G10L 15/075 |
| 10,170,123 | B2* | 1/2019 | Orr | ..................... H04L 12/2816 |
| 10,657,964 | B2* | 5/2020 | Xie | .......................... G06F 3/167 |
| 2018/0122375 | A1* | 5/2018 | Nishikawa | .............. G06F 3/167 |
| 2018/0342237 | A1* | 11/2018 | Lee | .......................... G10L 15/28 |
| 2019/0027135 | A1* | 1/2019 | Kim | ........................ G06F 40/20 |
| 2019/0198020 | A1* | 6/2019 | Li | ............................ G06F 3/167 |
| 2019/0214015 | A1* | 7/2019 | Kozuka | ................... G10L 15/20 |

* cited by examiner

*Primary Examiner* — Brian L Albertalli
(74) *Attorney, Agent, or Firm* — Birch, Stewart, Kolasch & Birch, LLP

(57) ABSTRACT

A home appliance including an audio input unit including at least one microphone and into which a voice command formed of natural language is inputted; a communication unit which transmits the voice command to a voice recognition system as voice data, and receives a response signal from the voice recognition system; a controller which sets an operation corresponding to the response signal, outputs an operation state, and outputs a guidance announcement, according to a result of voice recognition of the voice recognition system; and an audio output unit which outputs the guidance announcement corresponding to the operation, wherein the controller determines whether it is possible to set the operation or to support a function for the operation in response to the response signal and an operation state of the home appliance, and performs the operation.

20 Claims, 17 Drawing Sheets

HOME APPLIANCE, CONTROL SYSTEM BY VOICE RECOGNITION AND OPERATING METHOD OF THE SAME

CROSS-REFERENCE TO RELATED APPLICATION

This application claims the priority benefit of Korean Patent Application No. 10-2018-0002475, filed on Jan. 8, 2018 in the Korean Intellectual Property Office, the entire disclosure of which is incorporated herein by reference.

FIELD OF INVENTION

The present invention relates to a home appliance, control system using voice recognition that recognizes a user's natural language command and controls an operation, and an operating method of the same.

BACKGROUND

Generally, a laundry treating apparatus separates contaminants from clothes, bedding, and the like (hereinafter referred to as "laundry") by using chemical decomposition of water and detergent and physical action, such as friction between water and laundry.

Such a laundry treating apparatus has a basic structure in which a drum for accommodating laundry is rotatably installed, and may be divided into a front loading type in which clothes are put into the apparatus through an input port provided on the front surface, and a top loading type in which clothes are put into the apparatus through an input port provided on the upper surface of the apparatus.

Either of two types of the laundry treating apparatus treats the laundry. The drum accommodating the laundry rotates, and the steps of washing, rinsing, dewatering and/or drying of the laundry are sequentially or selectively performed to treat the laundry.

Such a laundry treating apparatus is operated by a user who directly operates a display and a plurality of switches positioned on the front surface or the upper surface. In addition, in recent years, as the laundry treating apparatus is connected to a network, such as the Internet, the laundry treating apparatus and a portable terminal are connected to each other through a network. In addition, in recent years, in order to control the laundry treating apparatus through a control application of the terminal, it is a tendency to control the operation of apparatus by recognizing user's voice. Accordingly, there are an increasing number of researches for the laundry treating apparatus to operate by recognizing the voice of the user.

Korean Patent Laid-Open No. 10-1999-00069703 (related art 1) is configured such that a remote controller for an air conditioner is provided with a voice input unit and a signal processing unit to generate and transmit an operation signal according to voice recognition.

Korean Patent Laid-Open Publication No. 10-2006-0015092 (related art 2) converts an input voice signal into a digital signal and text, checks whether there is a matching control command in the database, controls each device in an air conditioner when there is the matching control command, and if there is no matching control command, extracts a keyword and controls each device in the air conditioner according to the associated control command.

However, such a related art has a limitation in system resources that an individual device, such as a remote controller and an air conditioner, can have. Particularly, in order to recognize natural language rather than only a few words, high computational complexity is required, so that an embedded module installed in the individual device is difficult to implement the natural language recognition.

Further, Korean Patent Laid-Open Publication No. 10-2017-0110319 (related art 3) recognizes voice to control the operation, but is able to treat only a specific kind of cloth and allows a designated course for the cloth to operate, so that its usage is limited, and there is a limit in recognizing various voices.

Further, the voice recognition technology of the related art has limitations in recognizing and processing various natural language voice commands of users around the world.

Therefore, there is a need for a method capable of recognizing and processing natural language without restriction of system resources of a clothes control apparatus, and conveniently controlling the clothes control apparatus.

SUMMARY OF THE DISCLOSURE

The present invention has been made in view of the above problems, and provides a home appliance having a control system that uses voice recognition to recognize and process natural language in an efficient manner, and operates by analyzing a user's intention based on the recognized natural language, and an operating method of the same.

In accordance with an aspect of the present invention, a home appliance includes: an audio input unit into which a voice command formed of natural language is inputted; a communication unit which transmits the voice command inputted from the audio input unit to a voice recognition system as voice data, and receives a response signal from the voice recognition system; a controller which sets an operation corresponding to the response signal, outputs an operation state, and outputs a guidance announcement, according to a result of voice recognition of the voice recognition system; and an audio output unit which outputs the guidance announcement corresponding to the operation, wherein the controller determines whether it is possible to set the operation or to support a function for the operation in response to the intention analysis result of the voice recognition system and the operation state, and sets the operation.

The controller sets an operation in response to a control signal when the control signal corresponding to the voice command is received from a home appliance control server connected to the voice recognition system, and requests a sound source file for the guidance announcement to the voice recognition system and applies a received sound source file to the audio output unit.

In accordance with another aspect of the present invention, a control system includes: a home appliance to which a voice command of natural language is inputted; an automatic speech recognition server which receives voice data from the home appliance and converts the received voice data into text data; a natural language processing server which receives the text data from the automatic speech recognition server and analyzes the received text data to determine the voice command; a text-to-speech server which converts a response signal based on the voice command into voice data and transmits the voice data to the home appliance; and a home appliance control server which transmits a control signal corresponding to the voice command to the home appliance, in correspondence with data received from the natural language processing server and a state of the home appliance, wherein the home appliance determines, with respect to an operation to be performed in response to the control signal received from the home appliance control server, whether it is possible to set the operation or to support the operation, and then sets the operation, and outputs a guidance announcement for the operation by using a sound source file provided from the text-to-speech server.

In accordance with another aspect of the present invention, a method of operating a home appliance includes the steps of: inputting a voice command formed of natural language; transmitting the voice command as voice data to a voice recognition system and receiving a response signal from the voice recognition system; determining, with respect to an operation corresponding to the voice command, whether it is possible to set the operation or to support a function for the operation, in response to the response signal and an operation state of apparatus; setting and executing the operation, when it is possible to set or support; and outputting a guidance announcement corresponding to the operation.

In accordance with another aspect of the present invention, a method of operating a control system includes the steps of: inputting a voice command formed of natural language by a home appliance; converting the voice command and transmitting the voice data to the automatic speech recognition server by the home appliance; converting the voice data into text by the automatic speech recognition server; analyzing the text to determine the voice command by the natural language processing server; analyzing the state of the home appliance and data, corresponding to the voice command, received from the natural language processing server, and transmitting a control signal corresponding to the voice command to the home appliance, by the home appliance control server; setting an operation according to the control signal, by the home appliance; and outputting a guide announcement for the operation according to the sound source file provided from the text conversion server.

The control system and method for controlling a home appliance using voice recognition according to the present invention can recognize a natural language by voice of a user.

Further, the present invention can easily control the home appliance through natural language recognition, and can monitor the operation state thereof.

The present invention analyzes the intention of user's voice commands through natural language recognition, thereby controlling the operation of the home appliance and outputting a response according to a user's request.

The present invention can provide a guide according to the operation state of the home appliance through the intention analysis of voice command.

In addition, the present invention can classify cases where intention cannot be analyzed and separately analyze to form learning data for intention analysis.

The present invention can provide additional services in addition to the functions of the home appliance by using speech recognition.

BRIEF DESCRIPTION OF THE DRAWINGS

The objects, features and advantages of the present invention will be more apparent from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. In addition, a controller included in a home appliance and other components of the home appliance can be implemented by one or more microprocessors and can be implemented by a hardware device.

Hereinafter, the present invention will be described with reference to the drawings for explaining a clothes treating apparatus according to embodiments of the present invention.

Figure 1:
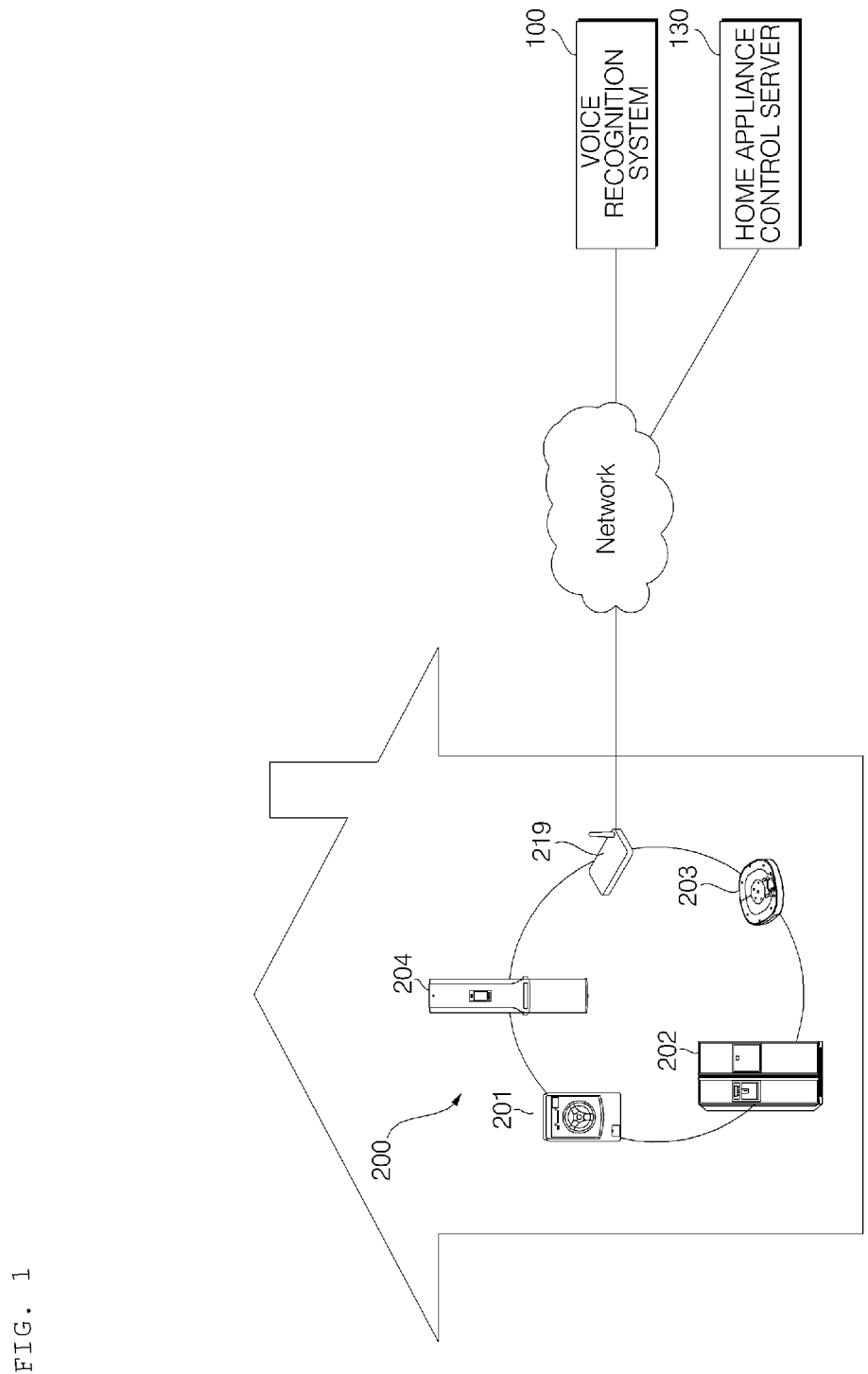
FIG. 1 is a schematic diagram of a control system according to an embodiment of the present invention.

FIG. 1 is a schematic diagram of a control system according to an embodiment of the present invention.

Referring to FIG. 1, the control system according to an embodiment of the present invention includes a home appliance 200 which has a communication module and is capable of communicating with other devices or connecting to a network, a voice recognition system 100 which recognizes and processes a voice, and a home appliance control server 130 which controls the home appliance according to a result of voice recognition. The home appliance control server may be included in a voice recognition system as needed.

The home appliance 200 may be a group of appliances, including a laundry treating apparatus 201, an air conditioner 204, a mobile robot 203, and a refrigerator 202, and may include a TV, a cooking device, and the like.

In addition, the home appliance may include a portable terminal, such as a smart phone, a tablet PC, and the like.

The home appliance 200 may include a communication module, and the appliances of the home appliance 200 may be interconnected to form a network, and the network of home appliances may be connected to an external network, e.g., the Internet, through a communication apparatus 219. In addition, the home appliance 200 may be connected to a network for separate voice recognition and home appliance control.

The communication apparatus 219 may be an access point AP that enables to perform mutual data transmission and reception between home appliances, and allows each home appliance to communicate with the voice recognition system 100 and the home appliance control server 130.

The communication method of the home appliance 200 may be a Wi-Fi communication method. Wi-Fi is just an example of a communication method, and the present invention is not limited thereto.

In addition, the home appliance 200 may include other type of communication module or a plurality of communication modules. For example, the home appliance may include an NFC module, a Zigbee™ communication module, a Bluetooth™ communication module, and the like.

The home appliance 200 may be connected to a server included in the voice recognition system 100 or a certain external server, or to a user's portable terminal through a Wi-Fi communication module or the like. The user may verify information on the home appliance 200 or control the home appliance 200 through the portable terminal.

The home appliance 200 may receive a voice input of user, and the voice recognition system 100 may recognize and analyze the voice input of user and the home appliance control server 130 may control the home appliance 200.

Meanwhile, at least some of the servers included in the voice recognition system 100 may be a server operated by a manufacturer of home appliance or a sales company, or a server operated by a company entrusted with a service by a manufacturer or sales company.

Figure 2:
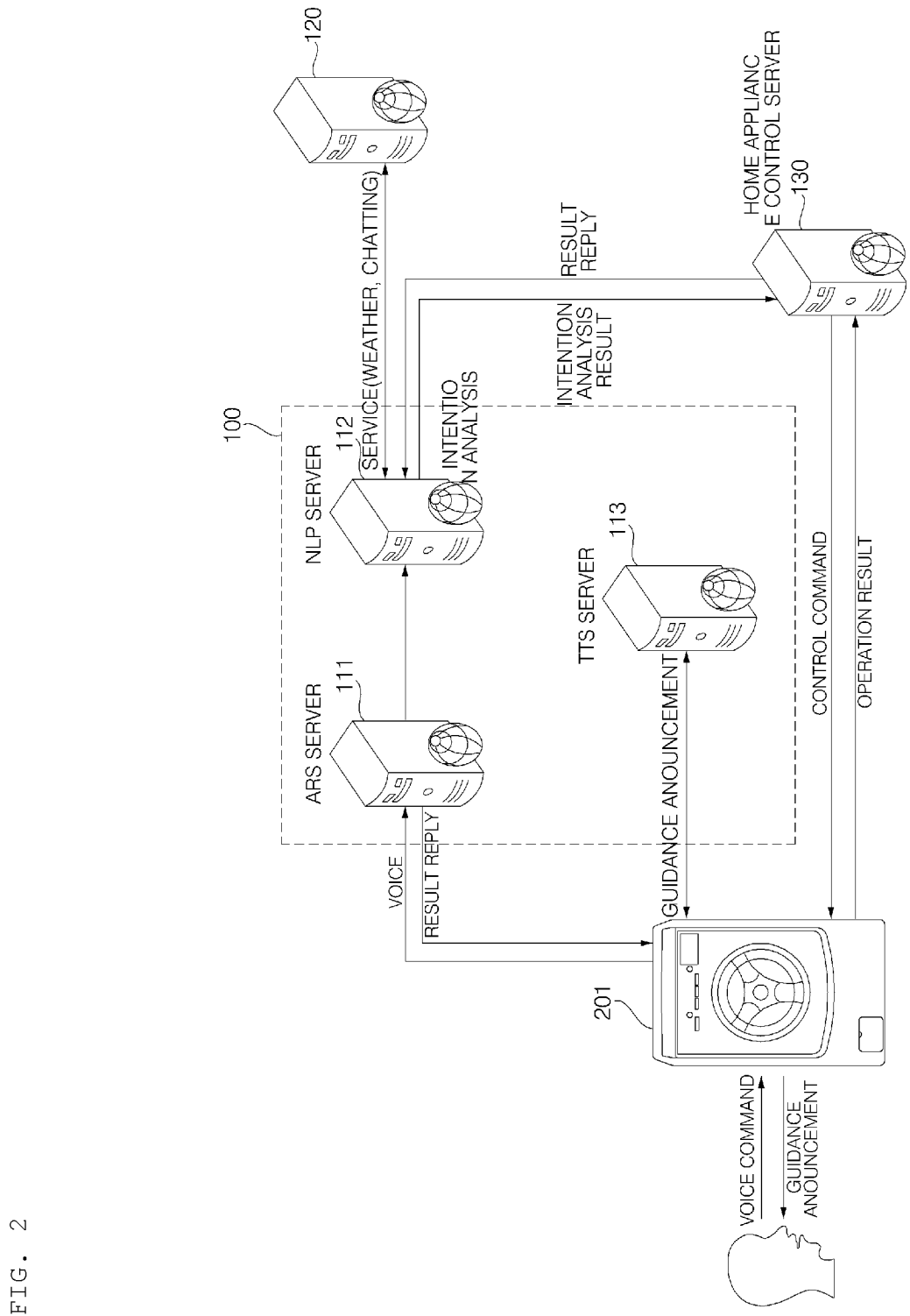
FIG. 2 is a diagram illustrating a home appliance, a voice recognition system, and a home appliance control server of a control system according to an embodiment of the present invention.

FIG. 2 is a diagram illustrating a laundry treating apparatus, a voice recognition system, and a home appliance control server of a control system according to an embodiment of the present invention. Hereinafter, the laundry treating apparatus will be illustrated as a home appliance.

As shown in FIG. 2, the control system may include a home appliance 200, for example, a laundry treating apparatus 201, a voice recognition system 100, a home appliance control server 130, and a service server 120 that provides a required service.

The control system includes the voice recognition system 100 receives voice data from the home appliance 200 (laundry treating apparatus 201), analyzing the voice data, and determining a voice command according to the analyzed voice data.

The voice recognition system 100 receives the voice data from the home appliance 200 (the laundry treating apparatus 201), converts the received voice data into text data, and analyzes the text data to determine a voice command. Further, the voice recognition system 100 may transmit a signal corresponding to the determined voice command to the home appliance control server 130 or the service server 120.

The home appliance control server 130 transmits a control signal based on a received request signal to the home appliance (laundry treating apparatus 201). The service server 120 determines a service corresponding to the request signal and transmits service data.

The voice recognition system 100 includes an automatic speech recognition (ASR) server 111, a natural language processing (NLP) server 112, and a text to speech (TTS) server 113.

In addition, the voice recognition system 100 may further include a connection service server for generating a request signal corresponding to a voice command and transmitting the request signal to the home appliance control server 130 or the service server 120.

The automatic speech recognition server 111, the natural language processing server 112, and the text-to-speech server 113 of the voice recognition system 100 may be implemented respectively by one or a plurality of servers, as shown in the drawing. In addition, the automatic speech recognition server 111, the natural language processing server 112, and the text-to-speech server 113 of the voice recognition system 100 may form a single voice server.

The automatic speech recognition server 111 receives voice data from the laundry treating apparatus 201 and converts the received voice data into text data.

The automatic speech recognition server 111 may perform voice recognition for the voice data received from the laundry treating apparatus 201 to generate text data and transmit the generated text data to the natural language processing server 112.

The natural language processing server 112 receives the text data from the automatic speech recognition server 111, analyzes the received text data to determine a voice command, and transmits a response signal based on the determined voice command to the laundry treating apparatus 201.

The natural language processing server 112 may analyze the text data received from the automatic speech recognition server 111 according to a natural language processing algorithm and determine a voice command.

The natural language processing server 112 may process a natural language that is routinely used by a person according to a natural language processing algorithm, and may analyze the intent of a user. The natural language processing server 112 may perform natural language processing for the text data received from the automatic speech recognition server 111 and determine a voice command that matches the intent of a user.

The natural language processing server 112 may determine a voice command that matches the intent of a user even if the user inputs a voice command in a daily use language.

The natural language processing server 112 may transmit a signal corresponding to the natural language processing result, i.e., a signal corresponding to the determined voice command, to the home appliance control server 130, or the service server 120.

If the determined voice command is related to the laundry treating apparatus 201, the natural language processing server 112 communicates with the home appliance control server 130 to perform a corresponding operation. If the voice command is not related to home appliances including the laundry treating apparatus 201, the natural language processing server 112 communicates with an external service server 120 to perform a corresponding operation.

The natural language processing server 112 determines whether it is possible to support the voice command determined based on the state information of the laundry treating apparatus 201, and may transmit a request signal corresponding to the determined voice command, or a signal indicating that it is an unsupported function to the home appliance control server 130. In some cases, the supportability of the voice command of the laundry treating apparatus can be determined by the home appliance control server 130.

The text-to-speech server 113 receives a signal including text corresponding to a response signal from the laundry treating apparatus 201, converts the text included in the received signal into voice data, and transmits the voice data to the laundry treating apparatus 201.

The laundry treating apparatus 201 may receive voice command input by the user and transmit the voice data based on the received voice command input to the voice recognition system 100.

The home appliance control server 130 may transmit a control signal based on the received request signal to the laundry treating apparatus 201.

For example, when a request to change a set temperature of the laundry treating apparatus 201 is received, the home appliance control server 130 may transmit a control signal for changing the set temperature to the laundry treating apparatus 201.

Meanwhile, the laundry treating apparatus 201 may perform a corresponding operation according to the control signal received from the home appliance control server 130.

In addition, after performing the requested operation, the laundry treating apparatus 201 may transmit a signal indicating that the operation is performed to the home appliance control server 130.

In addition, the home appliance control server 130 may receive a response signal for the control signal from the laundry treating apparatus 201, and transmit processing result information corresponding to the response signal.

In addition, the home appliance control server 130 may transmit the operation result received from the laundry treating apparatus 201 to the voice recognition system 100, and transmit a response signal including the processing result information to the laundry treating apparatus 201.

The voice recognition system 100 receives a signal including an output text corresponding to the processing result information from the laundry treating apparatus 201, converts the received output text into voice data, and transmits the voice data to the laundry treating apparatus 201. The response signal based on the determined voice command that the natural language processing server 112 transmits to the laundry treating apparatus 201 may include processing result information.

The laundry treating apparatus 201 may receive a response signal based on the voice command determined by the natural language processing server 112. Here, the response signal may include text data of a response corresponding to the determined voice command.

For example, when a user inputs a voice command to change the water temperature of the laundry treating apparatus, the response signal may include text data indicating that the water temperature is changed.

Meanwhile, the laundry treating apparatus 201 may transmit a signal including the text corresponding to the received response signal to the text-to-speech server 113. Here, the signal including the text corresponding to the response signal may include the output text corresponding to the processing result information.

Meanwhile, the text-to-speech server 113 converts the text included in the received signal into voice data and transmits the voice data to the laundry treating apparatus 201. Here, the converted voice data may include a sound source file.

The laundry treating apparatus 201 may output a voice guide message based on the received voice data through the speaker.

Meanwhile, the natural language processing server 112 may determine whether the laundry treating apparatus 201 can support the voice command based on the state information of the laundry treating apparatus 201 and, if it can support, may transmit a request signal corresponding to the determined voice command to the home appliance control server 130.

Further, when it is not possible to support the voice command determined based on the state information of the laundry treating apparatus 201, the natural language processing server 112 may transmit a signal indicating that it is an unsupported function. A signal indicating that it is an unsupported function may be included in a response signal based on the determined voice command transmitted by the natural language processing server 112.

The laundry treating apparatus 201 may request the voice data to the text-to-speech server 113, and output a voice guide message indicating that it is an unsupported function in the current state.

According to an embodiment, the home appliance control server 130 may determine whether voice command can be supported.

The control system of the present invention can be used by organically connecting servers having various roles for natural speech processing.

The laundry treating apparatus 201 performs operations such as reception and preprocessing of the voice command, and transmission to server, and the voice recognition system 100 may perform a natural language processing such as voice/text conversion, intention analysis, and command identification.

As the voice recognition system 100 performs the natural language processing, the laundry treating apparatus 201 may reduce the burden of the CPU, memory, etc. of the internal embedded module.

The laundry treating apparatus 201 may receive voice data including a sound source file from the voice recognition system 100 and output a voice guide message as an audio so that it is possible to reply to the voice input of a user through auditory feedback.

The laundry treating apparatus 201 may receive a voice file streaming from the voice recognition system 100, and reproduce and output the voice guide message to the user. Accordingly, the laundry treating apparatus 201 need not store various sound source files.

The control system ensures compatibility and connectivity through a plurality of servers and utilizes the home appliance control server 130 as a final control command so that collision between home appliances control using Wi-Fi communication and collision between the home appliance control through a portable terminal and the home appliance control by the voice input through the home appliance 300 can be prevented through the voice recognition process and the home appliance control server 130.

In addition, the control system can relieve a load concentrated on a specific server depending on a certain single server through an organic connection between the servers. In addition, since each server has a different role, when a problem occurs in a specific server, it is possible to respond easily by linking with other servers.

In addition, since a plurality of servers can be independently updated from time to time, it is advantageous for performance improvement.

Figure 3:
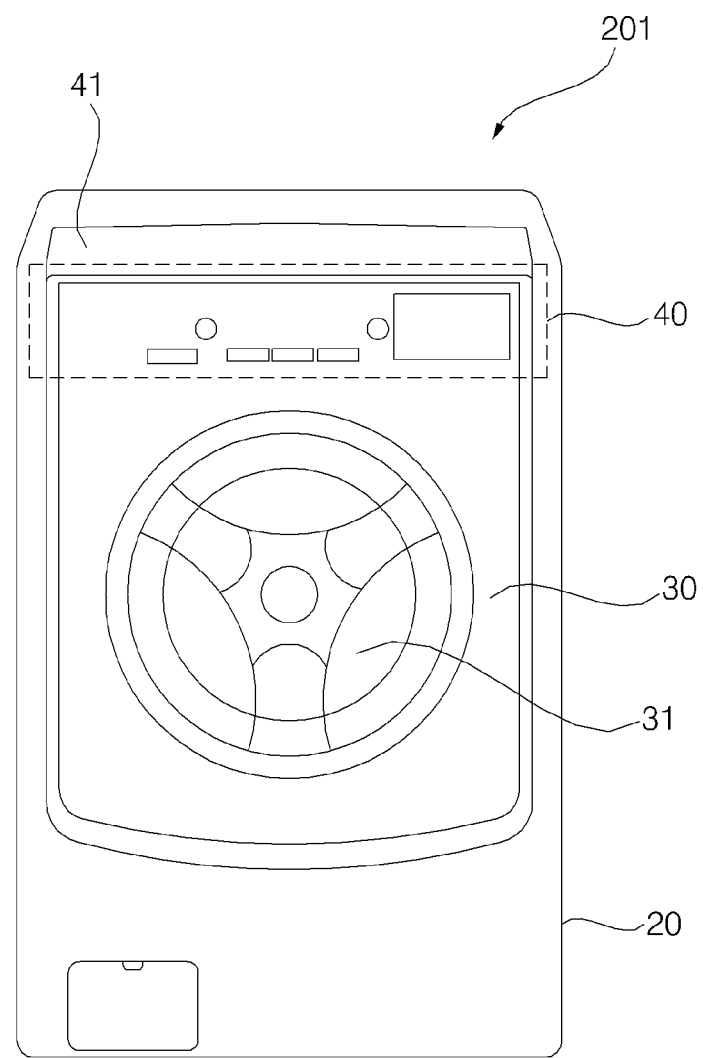
FIG. 3 is a diagram illustrating a home appliance according to an embodiment of the present invention.

FIG. 3 is a diagram illustrating a home appliance according to an embodiment of the present invention.

As shown in FIG. 3, the home appliance (laundry treating apparatus 201) includes a cabinet 20 which forms an outer shape and is provided with an input port, formed in the front F, through which laundry is input, a door 30 which opens and closes the input port through which the laundry is input into the cabinet 20, a tub which is disposed inside the cabinet and accommodates washing water, a drum 31 which is rotatably disposed inside the tub, and a driving unit which applies torque to the drum to rotate.

The laundry treating apparatus 201 may further include a control panel 40 which receives a user input and displays a laundry treatment machine state, and a detergent input unit 41 to which the detergent is input.

The cabinet 20 is provided with an input port so that laundry can be taken in and out. The door 30 is rotatably connected to the cabinet 20 so that the input port can be opened and closed. The door 30 of the laundry treating apparatus 201 may be provided with a control panel 40. In addition, in the laundry treating apparatus 201, the control panel 40 may be provided in the cabinet 20.

The tub forms a space for accommodating the washing water. The tub is disposed outside the drum 31 while surrounding the drum 31. A tub hole is formed on the front surface of the tub, and the tub hole is formed to communicate with the input port of the cabinet 20 so that laundry can be input into the drum 31.

The driving unit may be disposed in the rear side of the tub and generate a rotational force. The driving unit may be connected to a rotating shaft and rotate the drum 31. The driving unit may rotate the drum 31 at various speeds or directions.

The drum 31 accommodates the laundry and rotates. The drum 31 is disposed inside the tub. The drum 31 is formed in a rotatable cylindrical shape. The drum 31 is provided with a plurality of through holes to allow the washing water to pass through. The drum 31 receives the rotational force of the driving unit and rotates.

The cabinet 20 may include a water supply unit for supplying washing water from an external water source into the tub, and a drain unit for discharging the washing water in the tub to the outside.

The control panel 40 may include an operation unit for inputting various operation commands such as selection of a washing course, operation time and reservation for each process through a user, and an output unit for displaying the operation state of the laundry treating apparatus 201.

The control panel 40 according to the present embodiment is disposed in the door 30. That is, the input unit and the display unit may be formed in a front cover of the door 30, and the control panel 40 for controlling the input unit and the display unit may be disposed in the rear side of the front cover.

Figure 4:
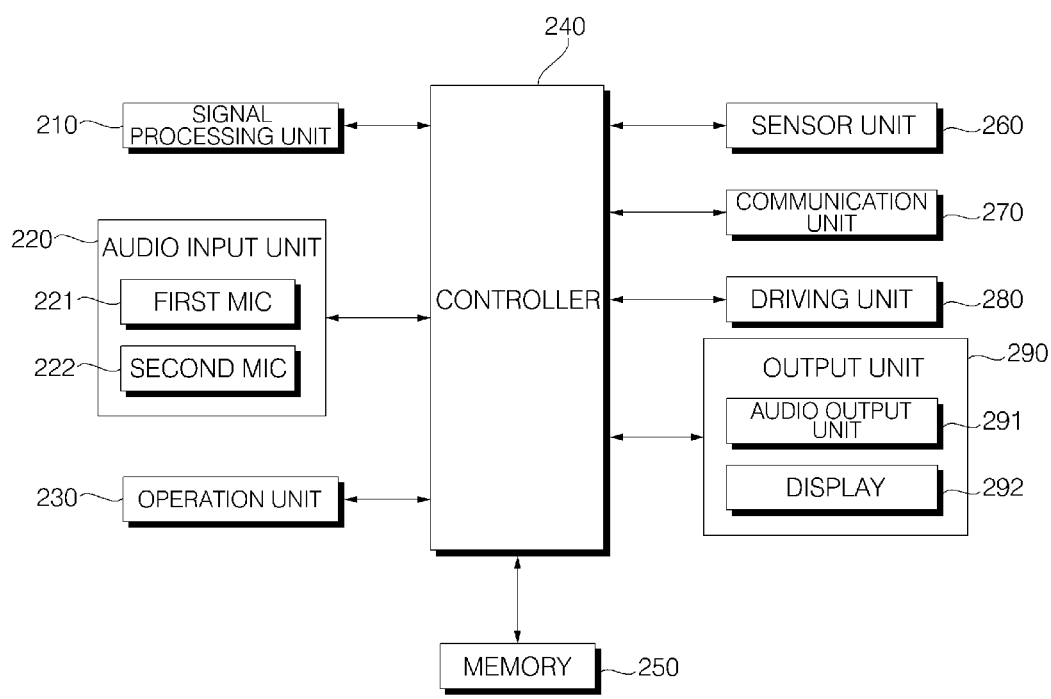
FIG. 4 is a block diagram schematically illustrating a control configuration of a home appliance according to an embodiment of the present invention.

FIG. 4 is a block diagram schematically illustrating a control configuration of a home appliance according to an embodiment of the present invention.

The laundry treating apparatus 201 according to the present invention includes an operation unit 230, an output unit 290, a sensor unit 260, a driving unit 280, a communication unit 270, a memory 250, a signal processing unit 210, an audio input unit 220, and a controller 240 for controlling overall operations.

The operation unit 230 includes input means such as at least one button, a switch, and a touch pad installed on the control panel 40.

The operation unit 230 inputs operation settings, including the setting or reservation of power input, operation mode, type of laundry, washing course, water level, temperature, and the like. When the type of laundry is selected and a power key is input, the operation unit 230 inputs data of the operation setting to the controller 240.

The output unit 290 outputs information on operation setting and operation state.

The output unit 290 includes a display 292 for displaying information by a combination of at least one of a character, a numeral icon, an image, and a special character, and an audio output unit 291 for outputting a certain sound effect or warning sound.

The display 292 may be implemented of display means, such as LCD, LED, and OLED, and may include a touch screen on which a touch pad is layered. The display 292 may further include an illumination unit for outputting an operation state depending on a lighting state, a lighting color, and a flicker state.

The display 292 may include a menu screen for operation setting and operation control of the laundry treating apparatus, and may output a guide message or warning formed of a combination of at least one of a character, a numeral, and an image with respect to the operation setting or operation state.

The display 292 displays a voice recognition step through an LED or a seven segment indicating an operation state according to the lighting state.

The audio output unit 291 outputs a voice guidance, a certain warning sound, and an effect sound. The audio output unit 291 includes a buzzer or a speaker.

The audio input unit 220 may receive an external audio signal and a user voice command. The audio input unit 220 may include one or more microphones (MICs).

In addition, the audio input unit 220 may include a plurality of microphones 221 and 222 so as to more accurately receive the user voice command. The plurality of microphones 221 and 222 may be disposed at different positions and may acquire an external audio signal and process the acquired signal into an electrical signal.

The audio input unit 220 includes a first microphone 221 and a second microphone 222. Although the present invention is illustrated based on two microphones, it is not limited thereto.

The audio input unit 220 may be connected to the signal processing unit 210 for converting analog sound into digital data, and may convert the voice command input by a user into data to be recognized by the controller 240 or a certain server.

The audio input unit 220 may use various noise elimination algorithms for eliminating noise generated in the process of receiving the voice command of user.

The signal processing unit 210 may include components for audio signal processing such as a filter for removing noise from an audio signal received by each of the microphones 221 and 222 of the audio input unit 220, an amplifier for amplifying and outputting a signal output from the filter, and the like. The audio input unit 220 and the signal processing unit 210 may be configured as a single module as needed.

The memory 250 records various information necessary for the operation of the laundry treating apparatus, and may include a volatile or nonvolatile recording medium. The recording medium stores data that can be read by a microprocessor, and may include a hard disk drive (HDD), a solid state disk (SSD), a silicon disk drive (SDD), a ROM, a RAM, a CD-ROM, a magnetic tape, a floppy disk, an optical data storage device, and the like.

The memory 250 stores control data for controlling the operation of the laundry treating apparatus, input operation setting data, data on the operation time calculated according to the setting, data on the washing course, and data for determining whether an error has occurred. In addition, the memory 250 stores data generated during the operation of the laundry treating apparatus or sensed through the sensor unit 260, and data transmitted and received through the communication unit 270.

Meanwhile, the memory 250 may store data for voice recognition, and the controller 240 may process the voice input signal of user received through the audio input unit 220 and perform a voice recognition process.

Simple voice recognition is performed by the laundry treating apparatus 201, and a high-level voice recognition, such as natural language processing, may be performed by the voice recognition system 100.

Limited data may be stored in the memory 250. For example, in the memory 250, data for recognizing a wake up voice signal including a preset call word may be stored. In this case, the controller 240 may recognize a wake-up voice signal including a preset call word from the voice input signal of user received through the audio input unit 220.

For example, when a wake up voice signal including a preset call word is received, the laundry treating apparatus 201 may be switched to a state for receiving a voice command. In this case, the laundry treating apparatus 201 performs only the voice recognition process up to the voice input of the call word, and the subsequent voice recognition for the voice input of user may be performed through the voice recognition system 100.

Since the system resource of the laundry treating apparatus 201 is limited, complex natural language recognition and processing may be performed through the voice recognition system 100.

The call word may be set by a manufacturer, and different call words may be set for each home appliance. For example, in the case of a laundry treating apparatus, "LG TROM" or "washing machine" may be set as a call word.

In addition, the setting of the call word may be changed by the user.

The controller 240 may control the voice command of user inputted after recognizing the wake up voice signal to be transmitted to the voice recognition system 100 through the communication unit 270.

The communication unit 270 includes one or more communication modules and may perform wireless communication with other electronic devices to exchange various signals. For example, the communication unit 270 may communicate with electronic devices inside/outside of home system 10.

The communication unit 270 may transmit the operation state of the laundry treating apparatus to a terminal or other laundry treating apparatus, and receive a control command from the terminal or an external server.

The communication unit 270 transmits and receives data through not only short-distance wireless communication such as ZigBee™ and Bluetooth™, but also a communication module such as Wi-Fi and WiBro™.

A power unit converts a supplied commercial power to supply operating power. The power unit blocks an overcurrent, rectifies and smoothens the supplied power, and supplies the operating power of a certain magnitude.

The sensor unit 260 includes a plurality of sensors to measure the voltage or current of the laundry treating apparatus, and detects the rotation speed of motor, the water level, the temperature, and the humidity to input to the controller 240.

The sensor unit 260 may include a door sensor (not shown), a temperature sensor (not shown), a current sensor (not shown), and a water level sensor. In addition, the sensor unit 260 may further include a speed sensor for sensing a rotational speed of motor, a humidity sensor, and a laundry sensor for detecting the state/material of the laundry.

The temperature sensor detects the temperature and water temperature inside the laundry treating apparatus, and detects the temperature of a heater when the heater is provided. A plurality of temperature sensors are provided, and are installed at different positions to detect the temperature. The water level sensor detects the height of the water supplied to the tub. The current sensor detects the current applied to the motor and the door sensor detects whether the door is opened or closed. The door sensor detects the open/close state of the door and inputs a detection signal to the controller 240, before performing an operation according to the setting. In addition, the door sensor may detect whether the laundry is stuck.

The driving unit 280 controls the driving of the connected motor, valve, and the like according to a control command of the controller. For example, the driving unit 280 controls the operation of the motor, by converting the supplied power into a power for rotating the motor and applying the power.

The controller 240 controls a series of washing processes of washing, rinsing, dewatering, and drying. Hereinafter, it is noted that performing washing includes all operations including washing, rinsing, dewatering, and drying.

The controller 240 stores the inputted operation setting in the memory 250, and controls the operation by calling a water level according to the washing course, a temperature setting, and a control pattern in correspondence with the data stored in the memory.

The controller 240 allows the operation setting or operation state to be output through the output unit 290. In addition, the controller 240 allows data to be transmitted to the outside through the communication unit 270, and processes data received from the outside. The controller 240 may change the operation setting so that the laundry treating apparatus operates in cooperation with other laundry treating apparatus based on the data of other laundry treating apparatus received through the communication unit 270.

The controller 240 controls the driving unit 280 according to the inputted setting, and accordingly performs a series of washing processes such as washing, rinsing, and dewatering.

In addition, the controller 240 transmits the audio data which is inputted through the audio input unit 220 and converted by the signal processing unit 210 to the voice recognition system 100 through the communication unit 270, and sets an operation in response to a control signal applied from the home appliance control server 130. In addition, the controller 240 controls the data received from the voice recognition system 100 to be outputted through the audio output unit 291.

The controller 240 determines whether it is possible to set or support in response to the result of the intention analysis of the voice recognition system 100 and the operation state of the laundry treating apparatus 201, and then sets the operation.

When a control signal corresponding to the voice command is received from the home appliance control server 130 connected to the voice recognition system, the controller sets an operation in response to the control signal, and requests a sound source file for a guidance announcement to the voice recognition system 100 and applies the received sound source file to the audio output unit 291 so that the guidance announcement can be output.

The controller 240 sets a voice recognition standby mode according to the input of a voice recognition key, and inputs a voice command through the audio input unit. The controller sets and controls an operation in response to a control signal received from the home appliance control server 130, and outputs the operation state or the progress state through the display.

The controller 240 controls a voice recognition icon displayed on the display 292 to vary, when a voice command is input through the audio input unit in a standby state for voice recognition. The controller 240 varies a flicker period of the voice recognition icon, and displays a voice recognition step.

The controller 240 may transmit the voice data to the voice recognition system 100 and display a progress state on the display 292 in combination with at least one of a character, a number, an icon, and an image during voice recognition.

The controller may output guidance for explaining the washing method as a guidance announcement in response to a request for washing guide according to a voice command, may output the operating state of the laundry treating apparatus as a guidance announcement, and may output information on an error and a corresponding countermeasure as a guidance announcement when an error occurs.

When re-outputting the guidance announcement, the controller outputs the guidance announcement composed of different words having the same meaning. For example, when recognition is failed, the controller outputs the guidance announcement of different words at random such as "Sorry, please re-input." "Not recognized", "Fail to recognize", or the like, in the same recognition failure situation.

Figure 5:
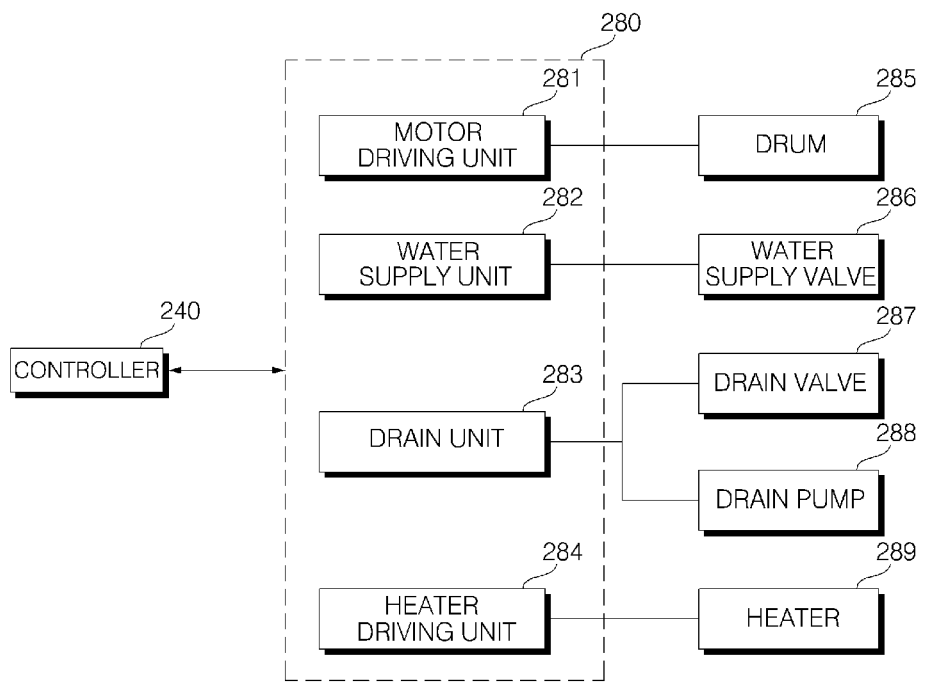
FIG. 5 is a block diagram illustrating a configuration of a driving unit of the home appliance of FIG. 4.

FIG. 5 is a block diagram illustrating a configuration of a driving unit of the home appliance of FIG. 4.

As shown in FIG. 5, the driving unit 280 controls a motor that is connected to the drum 31 and provides a driving force to the drum, controls the supply and drain of water, and controls a valve to be turned on/off.

The driving unit 280 includes a motor driving unit 281, a water supply unit 282, a drain unit 283, and a heater driving unit 284. The driving unit 280 may be configured of a plurality of driving units according to each configuration of the laundry treating apparatus or, in some cases, may be configured of a single driving unit.

The motor driving unit 281 controls the rotational direction, the rotational angle, and the rotational speed of the drum 31. The motor driving unit 281 controls the motor to operate differently according to the set washing course and the proceeding washing, rinsing, and dewatering. The driving unit 280 differently controls the rotation direction, the rotation angle, and the rotation speed of the driving unit so that the washing water in the drum forms a certain type of water flow.

The water supply unit 282 controls the opening and closing of a water supply valve 286. The water supply unit 282 repeats water supply continuously or stop water supply after the water supply for a certain time according to the washing and rinsing process, so that water is intermittently supplied.

The drain unit 283 controls the opening and closing of a drain valve 287, and controls the operation of a drain pump 288 so that water in the tub is discharged to the outside through a drain hose.

The heater driving unit 284 controls the operation of a heater 289 for heating the washing water. The heater driving unit 284 controls the power supplied to the heater, and operates the heater according to the washing water temperature. Further, the heater driving unit 284 may dry the laundry in a drying process.

Figure 6:
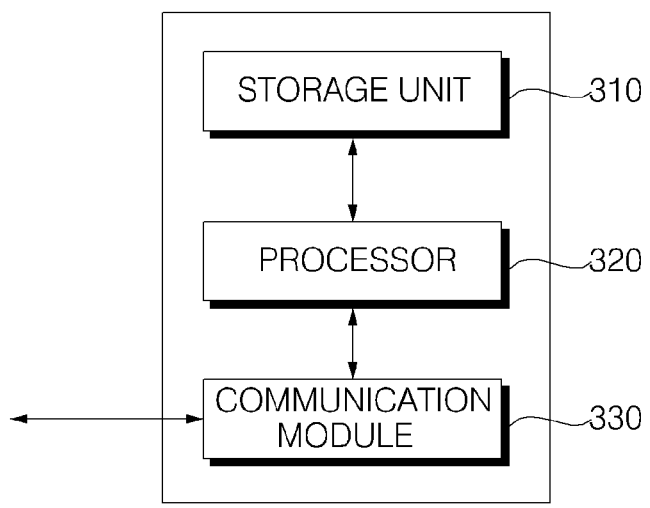
FIG. 6 is a block diagram schematically illustrating a configuration of a home appliance control server of a control system of the present invention.

FIG. 6 is a block diagram schematically illustrating a configuration of a home appliance control server of a control system of the present invention.

As shown in FIG. 6, the home appliance control server 130 may include a communication module 330, a storage unit 310, and a processor 320. It may be applied not only to the home appliance control server but also to the automatic speech recognition server 111, the natural language processing server 112, and the text-to-speech server 113.

The processor 320 may control the overall operation of the server.

The communication module 330 may receive various data such as state information, operation information, manipulation information, voice data, character data, and the like from home appliance such as portable terminal, air conditioner, and other server.

In addition, the communication module 330 may transmit data corresponding to the received various information, as it is or after a certain processing, to a portable terminal, a home appliance such as a laundry treating apparatus, other server, or the like.

To this end, the communication module 330 may include one or more communication modules such as an Internet module, a mobile communication module, and the like.

The storage unit 310 may store received information, and may include data for generating result information corresponding thereto.

The storage unit 310 may store data for operation of a corresponding server.

For example, in the case of the automatic speech recognition server 111, the storage unit 310 may store an automatic voice recognition algorithm, and the like. In the case of the home appliance control server 130, the storage unit 310 may store product information and state information of the home appliance, and data for the control of the home appliance.

Meanwhile, the voice recognition system and the home appliance control server may be a server operated by a home appliance such as a laundry treating apparatus or a server operated by a service provider, respectively, or may be a kind of a cloud server.

Figure 7:
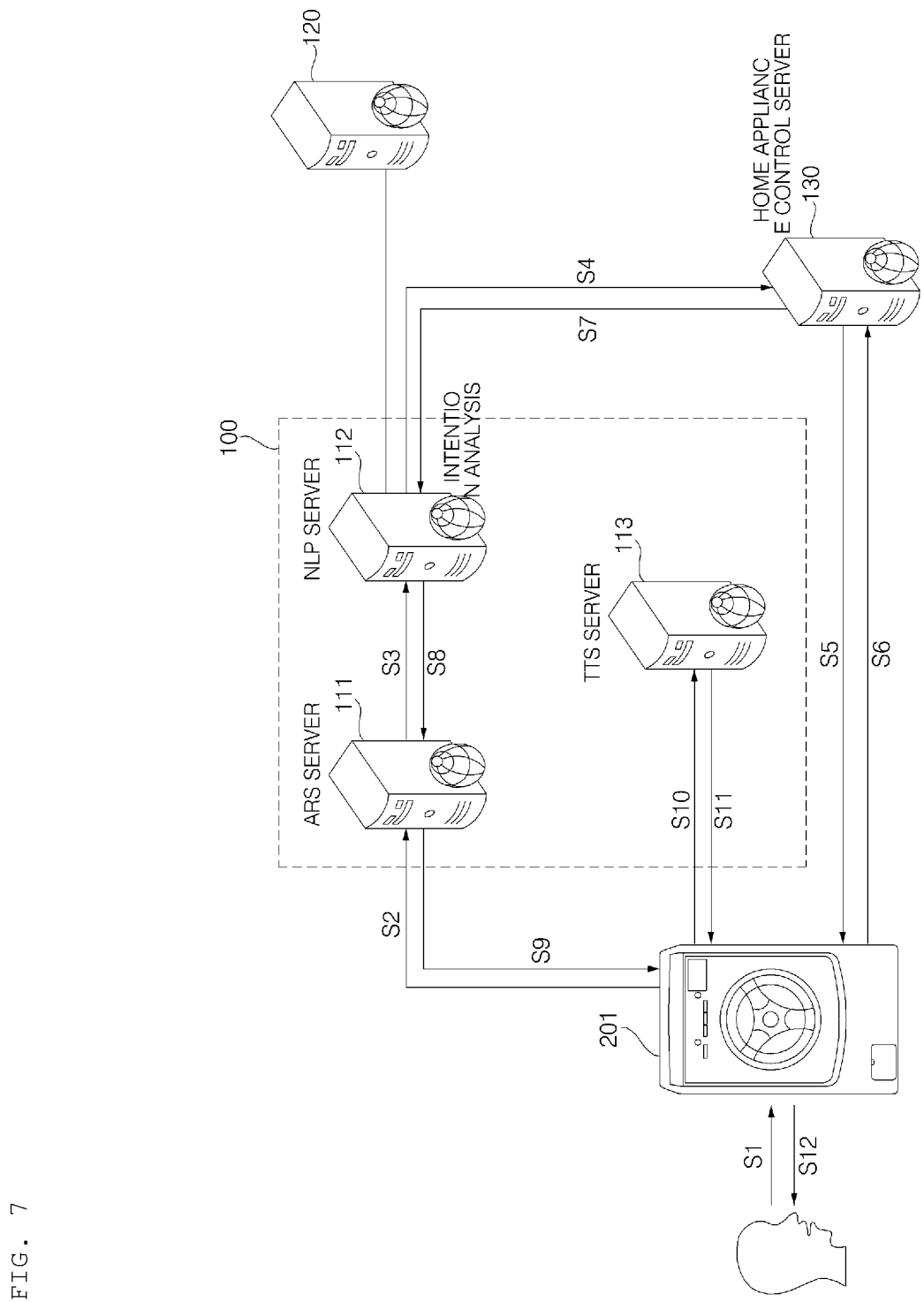
FIGS. 7 and 8 are exemplary diagrams illustrating a signal flow of a control system according to an embodiment of the present invention.
Figure 8:
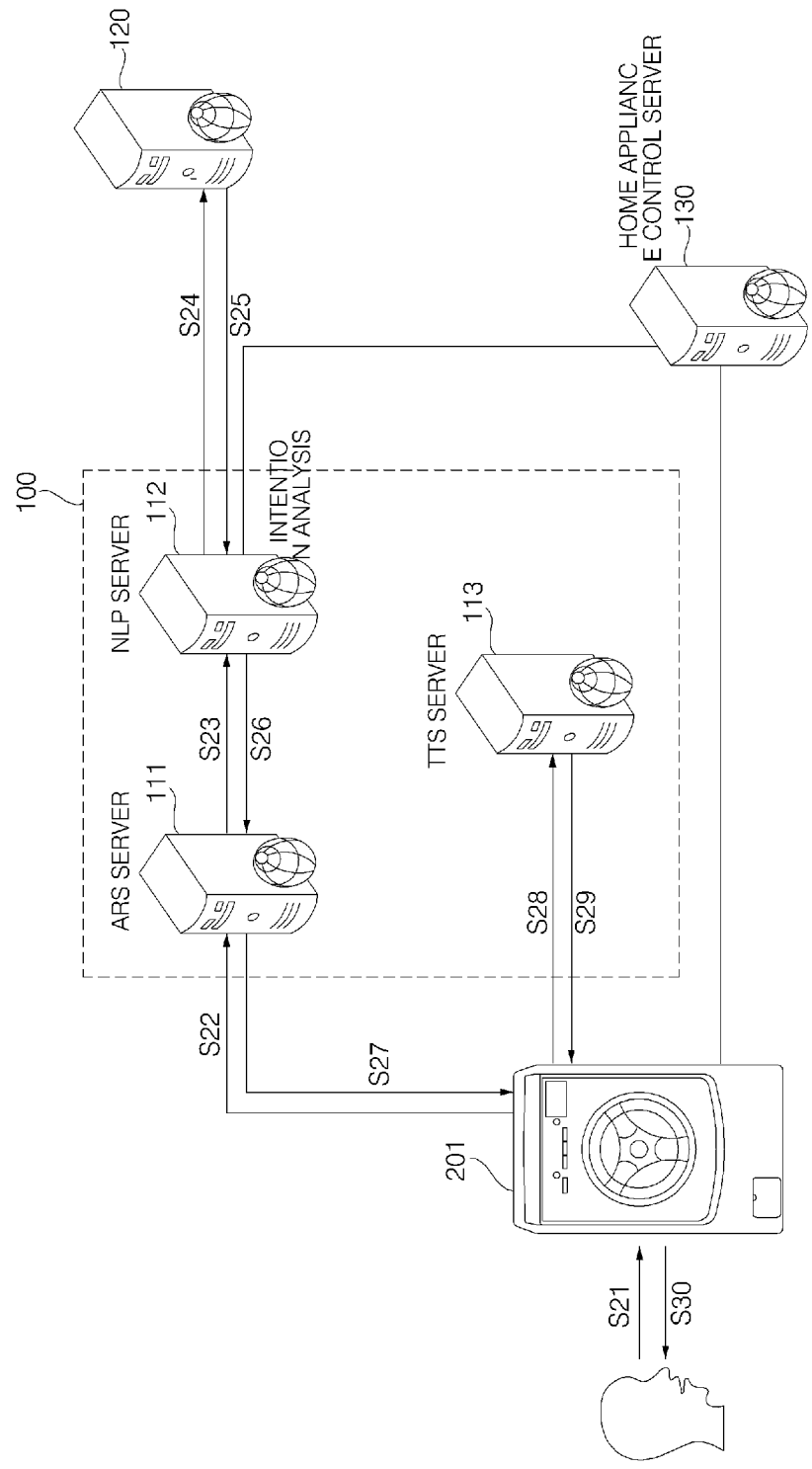

FIGS. 7 and 8 are exemplary diagrams illustrating a signal flow of a control system according to an embodiment of the present invention.

As shown in FIG. 7, a voice command of user is inputted to the laundry treating apparatus 201 (S1). The laundry treating apparatus 201 may transmit the received voice command of user to the voice recognition system 100 (S2).

For example, when the laundry treating apparatus 201 receives a command for setting a course such as 'TROM, wash with a standard course', the laundry treating apparatus 201 may convert the received voice command into digital voice data of a certain format such as a wave file and transmit to the automatic voice recognition system 100.

After receiving a wake-up signal including the call word, the laundry treating apparatus 201 may wait a command input and send an inputted voice command to the voice recognition system 100. Alternatively, the laundry treating apparatus 201 may receive continuous voice input including a call word and a voice command.

In a system including the laundry treating apparatus 201, the home appliance control server, and the voice recognition system 100, a signal transmitted and received between apparatuses may further include identification information of each apparatus, a session value for performed task, and the like in addition to exchanged main data.

The automatic speech recognition server 111 may recognize the received voice data and convert the recognized voice data into text data, and may transmit the text data to the natural language processing server 112 (S3).

The natural language processing server 112 may perform natural language processing for the received text data to analyze and determine the intention of the voice command of user.

The natural language processing server 112 may determine the voice command having the intention of user to set the washing course of the laundry treating apparatus 201 from the command 'TROM, wash with a standard course'.

The natural language processing server 112 may transmit a signal corresponding to the determined voice command to the associated service server 120 (S4).

The home appliance control server 130 inquires current state information of the laundry treating apparatus 201 and generates a control signal for the laundry treating apparatus 201 according to the determined voice command. For example, the home appliance control server 130 may transmit a signal for setting a standard washing course to the laundry treating apparatus 201 (S5).

The laundry treating apparatus 201 sets a standard course according to a control signal of the home appliance control server and operates. Further, the laundry treating apparatus 201 transmits a response signal for the controller signal to the home appliance control server 130 (S6).

After the control of the laundry treating apparatus 201, the home appliance control server 130 receives the response signal for the control signal, and transmits processing result information informing that the operation for the request is successful to the natural language processing server 112.

At this time, the home appliance control server 130 may transmit a signal corresponding to the processing result information related to the standard course setting to the natural language processing server 112 (S7).

The natural language processing server 112 transmits a signal corresponding to the processing result to the automatic speech recognition server 111 (S8), and transmits the processing result to the laundry treating apparatus 201 (S9). Here, the response signal based on the determined voice command of user may include the processing result information. The response signal may include a text (output word) corresponding to the processing result information such as "set standard course."

The laundry treating apparatus 201 transmits a text of the response signal to the text-to-speech server 113 (S10). The text-to-speech server converts the text included in the received signal into voice data, and transmits the voice data to the laundry treating apparatus 201 (S11).

The laundry treating apparatus 201 outputs the received guidance announcement PCM through the audio output unit 291 (S12). Accordingly, a user may check the processing result of the voice command through voice. For example, the laundry treating apparatus 201 may output a processing result "standard course is set" as a guidance announcement, with respect to the voice command "TROM, wash with a standard course".

Meanwhile, if the voice command inputted to the laundry treating apparatus 201 is related to an unsupported function, the home appliance control server 130 inquires the state of the laundry treating apparatus 201 and determines that the command is unsupported. Accordingly, the home appliance control server 130 may transmit a signal to the laundry treating apparatus 201 so as to output the text "It is not supported function." In some cases, the natural language processing server 112 may determine whether the function is supported. The natural language processing server may determine by requesting the home appliance control server to inquire the state of the home appliance At this time, a response signal to the determined voice command may be transmitted from the home appliance control server to the laundry treating apparatus, or may be transmitted to the laundry treating apparatus through the natural language processing server and the automatic speech recognition server.

The laundry treating apparatus may transmit the text included in the received response signal to the text-to-speech server 113, receive a sound source file received from the text-to-speech server 113, and output a guidance announcement "It is not supported function" through the audio output unit.

FIG. 8 is a diagram illustrating a signal flow for providing an external service according to a voice command of user.

As shown in FIG. 8, when a voice command such as "How is the weather today?" is inputted from the user (S21), the laundry treating apparatus 201 converts and transmits the voice command to the automatic speech recognition server 111 (S22). The automatic speech recognition server 111 recognizes received voice data and converts the voice data into text, and transmits text data to the natural language processing server 112 (S23).

The natural language processing server 112 may perform natural language processing of the received text data, and analyze and determine the intention of the voice command of user. Further, the natural language processing server 112 determines that the determined voice command is not related to the operation of the laundry treating apparatus, and transmits the data of the determined voice to the service server 120 (S24). The natural language processing server 112 transmits data to a service server that provides an external service according to the type of the requested information. For example, weather information is transmitted to a weather service server.

The service server 120 generates a response signal for the received data and transmits the response signal to the natural language processing server 112 (S25).

The natural language processing server 112 transmits a response signal to the automatic speech recognition server (S26), and the automatic speech recognition server transmits the response signal to the laundry treating apparatus 201 (S27).

The laundry treating apparatus 201 transmits the text included in the received response signal to the text-to-speech server 113 (S28). The text-to-speech server 113 that received the text may convert the text included in the received signal into voice data, and transmit the voice data to the laundry treating apparatus 201 (S29).

Based on the received voice data, the laundry treating apparatus 201 may output a voice guide message such as "Today's weather is clear at a maximum temperature of 10 degrees, and fine dust is good" (S30).

Figure 9:
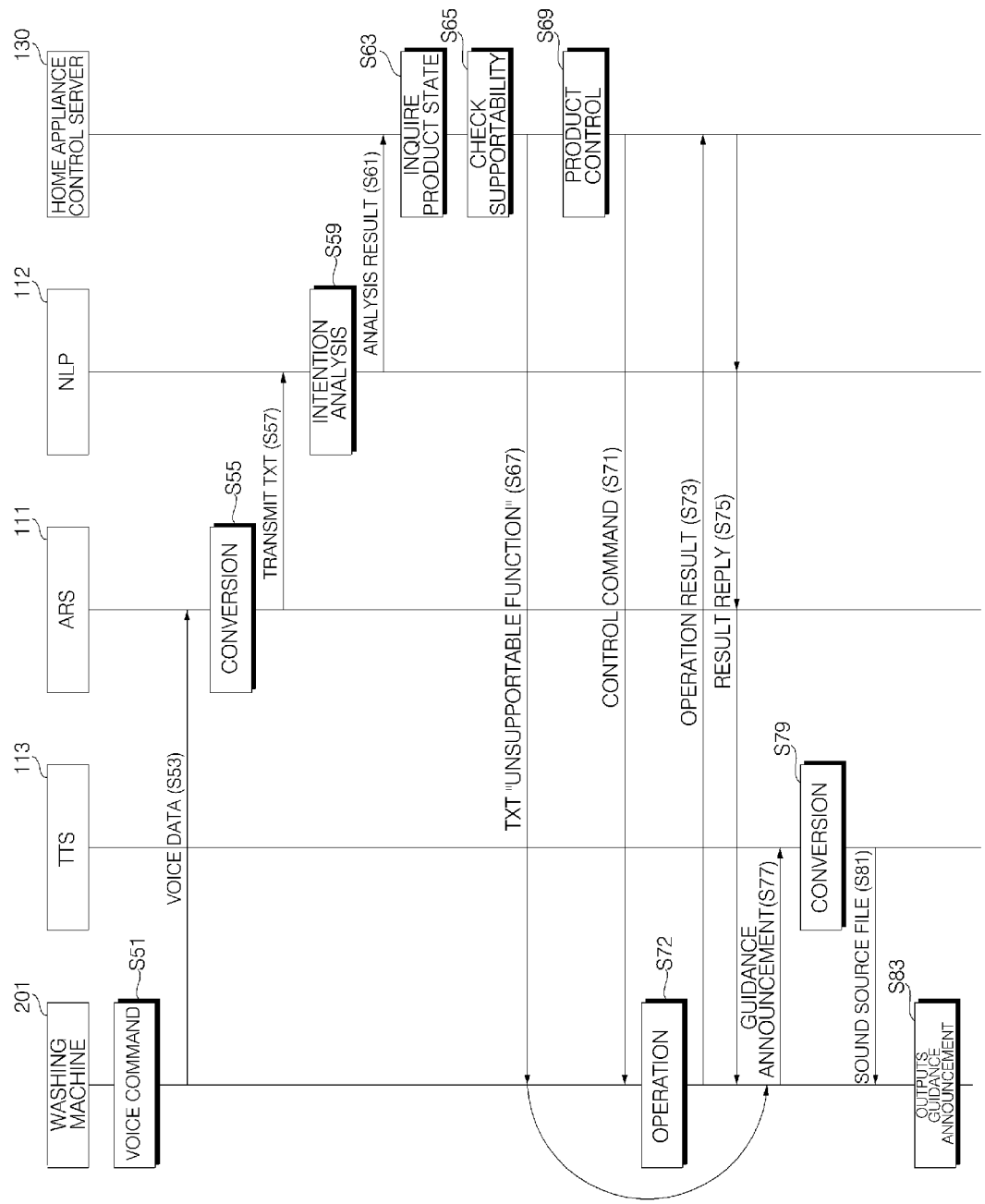
FIG. 9 is a flowchart illustrating a signal flow according to voice recognition in a control system according to an embodiment of the present invention.

FIG. 9 is a flowchart illustrating a signal flow according to voice recognition in a control system according to an embodiment of the present invention.

As shown in FIG. 9, the laundry treating apparatus 201 receives a voice signal, when a voice command (S51) of user is inputted in a state where the voice recognition function is activated.

The laundry treating apparatus 201 may enter a wake up signal standby mode for inputting a wake up voice signal including a preset call word. In addition, when the preset call word is inputted through the microphone 221 and 222, it may be switched to a command standby mode for receiving a voice command.

The laundry treating apparatus 201 converts the voice command into voice data and transmits to the automatic speech recognition server 111 (S53). The automatic speech recognition server 111 recognizes the voice data and converts into text (S55), and transmits the text of the determined voice to the natural language processing server 112 (S57).

The natural language processing server 112 analyzes the user's intention by analyzing the voice-recognized text (S59). The natural language processing server 112 transmits the analysis result to the home appliance control server 130 (S61). The natural language processing server 112 may determine whether the voice command relates to operation setting, change, guidance of the washing machine, or relates to the request of external information excluding the operation of the washing machine.

In response to the analysis result received from the natural language processing server, the home appliance control server 130 inquires the product state of the laundry treating apparatus (S63). The home appliance control server checks whether a command for the determined voice can be supported by the laundry treating apparatus (S65).

In the case of a supportable function, the home appliance control server 130 generates a control signal for product control (S69), and transmits the control signal to the laundry treating apparatus 201 (S71).

The laundry treating apparatus 201 sets an operation according to a control signal of the home appliance control server (S72). The laundry treating apparatus transmits the operation result of the control signal to the home appliance control server 130 (S73).

The home appliance control server 130 checks the response of the home appliance and transmits a corresponding result to the natural language processing server and the automatic speech recognition server. Further, the automatic speech recognition server replies the result to the laundry treating apparatus (S75). At this time, the natural language processing server and the automatic speech recognition server generate a text for the processing result and transmit a response signal to the laundry treating apparatus. The laundry treating apparatus transmits the text of the received response signal to the text-to-speech server 113. The text-to-speech server converts the text into a sound source file (S79) and transmits to the laundry treating apparatus (S81).

The laundry treating apparatus outputs the sound source file as a guidance announcement through the audio output unit (S83).

Meanwhile, in the case of a non-supportable function, the home appliance control server 130 generates a corresponding response signal and transmits to the natural language processing server. The natural language processing server transmits the response signal to the automatic speech recognition server. The automatic speech recognition server transmits the response signal to the laundry treating apparatus (S67).

The laundry treating apparatus transmits the text 'It is not supported function' included in the response signal to the text-to-speech server (S77), and the text-to-speech server converts the received text into a sound source file (S79) and transmits to the laundry treating apparatus (S81).

The laundry treating apparatus outputs the received sound source file as a guidance announcement (S83).

Figure 10:
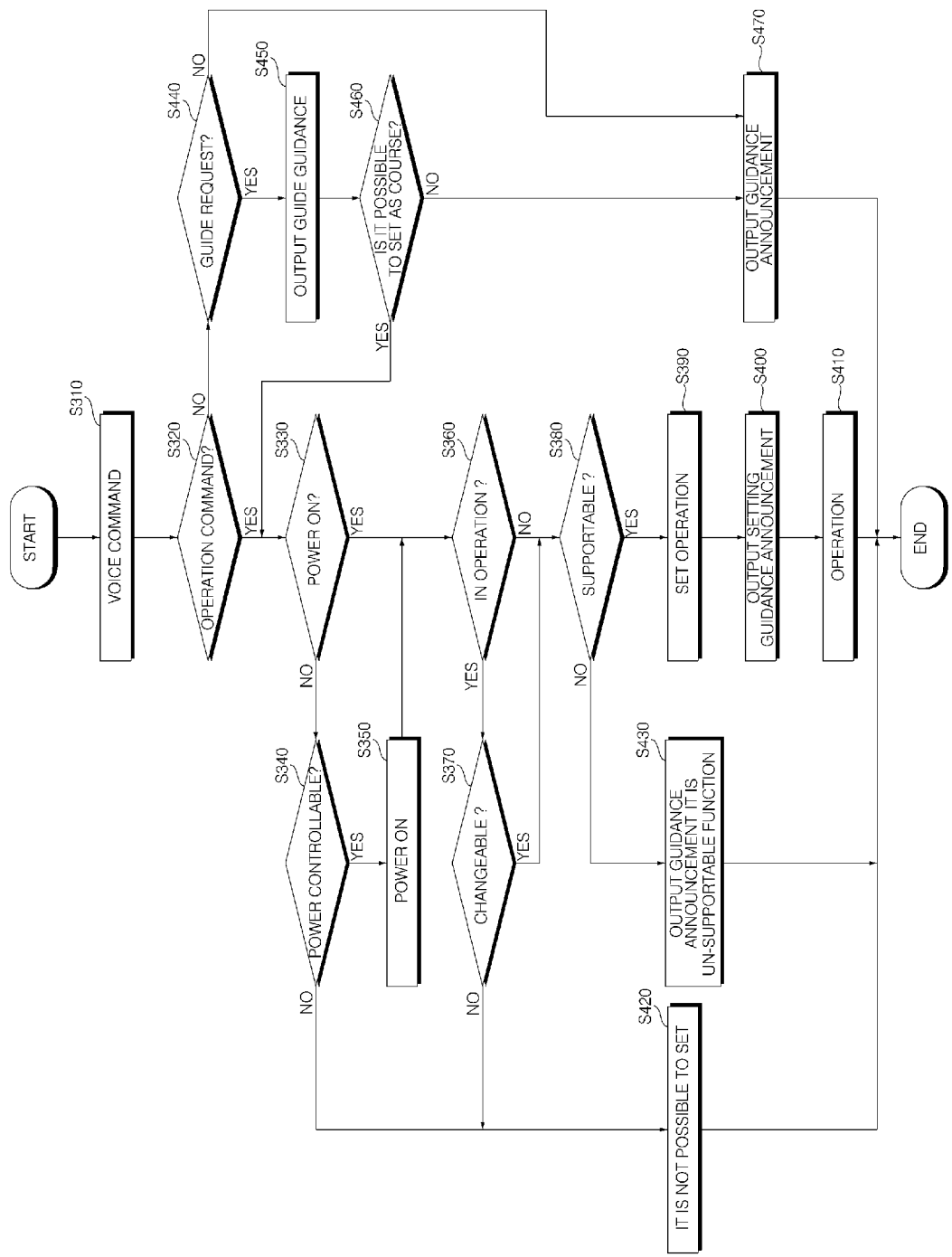
FIG. 10 is a flowchart illustrating a method of operating a laundry treating apparatus using voice recognition in a control system according to an embodiment of the present invention.

FIG. 10 is a flowchart illustrating a method of operating a laundry treating apparatus using voice recognition in a control system according to an embodiment of the present invention.

As shown in FIG. 10, when a voice command is inputted (S310), the laundry treating apparatus 201 transmits a voice command as voice data to the voice recognition system 100 to determine whether it is an operation command (S320).

At this time, the voice data is converted into text through the voice recognition system, and the intention analysis is performed by the natural language processing server. Through the intention analysis, it may be determined whether it is a command for the operation of the laundry treating apparatus 201. The home appliance control server 130 may apply a control signal of the laundry treating apparatus based on the intention analysis and the voice recognition result. Further, the laundry treating apparatus 201 receives a response signal from the voice recognition system 100 or the home appliance control server 130. Hereinafter, the signal processing by the voice recognition system is the same as shown in FIGS. 7 to 9 described above, and a description thereof will be omitted below.

In the case of an operation command, the laundry treating apparatus 201 determines a current power state (S330). When the power is turned off, the laundry treating apparatus 201 determines whether power is controllable (S340), and turns on the power when power is controllable (S350).

In addition, when a voice command such as "Turn on power" is inputted, the power may be turned on accordingly.

Meanwhile, when the power is un-controllable, and when power cannot be turned on through a touch of user or a key input, the laundry treating apparatus 201 outputs a guidance announcement such as 'It is not possible to set' or 'Please command after on turning power' through the audio output unit (S420). At this time, the guidance announcement is provided from the text-to-speech server of the voice recognition system 100, depending on the situation.

The laundry treating apparatus 201 determines whether it is operating in a power-on state (S360).

When the laundry treating apparatus 201 is performing a preset operation, it determines whether the current operation can be changed according to the voice command (S370). When it is not possible to change the current operation, the laundry treating apparatus 201 outputs a guidance announcement such as 'It is not possible to set' or 'It cannot be changed during operation' (S420).

When the operation is stopped or the setting can be changed, the laundry treating apparatus 201 determines whether the voice command is a supportable function (S380).

In case of an un-supportable function, the laundry treating apparatus 201 outputs a guidance announcement such as 'It is un-supportable function' (S430).

Meanwhile, when the inputted voice command is a supportable operation command, and the power is turned on, if there is no preset operation currently or operation can be changed even when it is operating, the laundry treating apparatus 201 may set operation according to the voice recognition result (S390).

For example, when a voice command such as "Wash in a standard washing course" is inputted, the laundry treating apparatus 201 receives a control signal according to the standard washing course setting through the voice recognition system 100 and the home appliance control server 130, and sets a standard washing course.

Further, the laundry treating apparatus 201 transmits the operation result according to the operation setting to the home appliance control server in response to the control signal.

Based on the received response signal, the laundry treating apparatus 201 outputs the guidance announcement provided by the text-to-speech server (S400). For example, a guidance announcement such as 'Standard laundry is set' may be outputted.

The laundry treating apparatus 201 starts the operation according to the setting (S410).

Meanwhile, when the voice command is not an operation command but a guide request (S440), a guidance announcement for the requested guide is outputted (S450). For example, the guidance for a washing method such as a beer washing method may be outputted.

Further, the laundry treating apparatus 201 determines whether it is possible to set as a course with respect to the guided washing method (S460).

If a guidance for the guide is outputted when it is possible to set as a course, a washing course is set in correspondence with the current state of the laundry treating apparatus 201 as described above (S330 to S410), together with the guidance announcement for the course setting. The course setting may be progressed according to a response of user for the guidance announcement such as 'Would you like to set it as a course?'

When it cannot be set as a course, a guidance announcement "It cannot be set as a course. Please set manually" (S470) may be outputted. In some cases, when it is not possible to set as a course, the guidance announcement for the guide may be terminated and an input of new voice command may stand by.

In addition, when the voice command is not an operation command or a guide request, and in the case of an external service such as weather as shown in FIG. 8, the data received through the service server 120 may be converted into sound source data through the text-to-speech server and then outputted as a guidance announcement (S470).

In addition, if the voice command is not related to the operation command, the guide request, and the external service, a corresponding guidance announcement is outputted. For example, in the case of an error of the laundry treating apparatus 201, the state information of the laundry treating apparatus 201 may be outputted as a guidance announcement. In addition, in the case where the voice cannot be recognized, a guidance announcement "I did not understand. Please tell me again" may be outputted.

Figure 11:
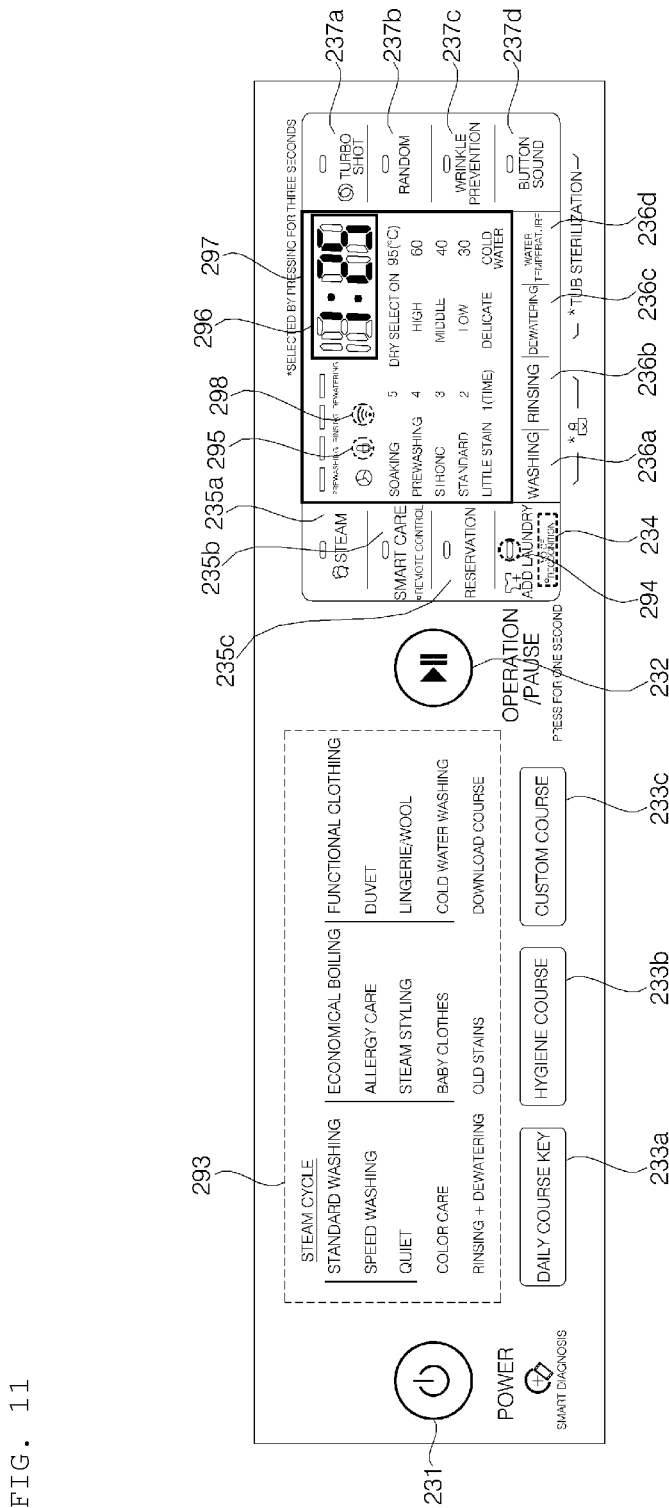
FIG. 11 is an exemplary diagram of a control panel of a laundry treating apparatus according to an embodiment of the present invention.

FIG. 11 is an exemplary diagram of a control panel of a laundry treating apparatus according to an embodiment of the present invention.

The laundry treating apparatus 201 has a control panel as shown in FIG. 11.

The control panel 40 displays a plurality of keys, and a menu for washing course and setting.

The control panel 40 is provided with a power key 231, an operation key 232, a course setting key 236*a* to 236*d*, and a function setting key 234, 235*a* to 235*d*, and 237*a* to 237*d*.

Further, in the control panel 40, a course menu 293 and a setting menu 297 are displayed on a display 292.

The power key 231 may be used as a smart diagnostic key when inputting a long key.

The operation key 232 operates as an operation or pause key according to the number of operations. The set operation may be started, or the operation may be temporarily stopped during operation.

The course setting key 236*a* to 236*d* may individually set washing, rinsing, dewatering, and water temperature.

The function setting key 234, 235*a* to 235*d*, and 237*a* to 237*d* may perform operation setting such as reservation 235*c*, smart care 235*b*, steam 235*a*, and turbo shot 237*a*, and perform an auxiliary setting such as random 237*b*, wrinkle prevention 237*c*, and a button sound 237*d*.

When laundry is added during operation, the laundry additional key 234 pauses operation and releases the locking of the door. The laundry additional key 234 may be used as a voice recognition key according to a key input type. For example, when long key is inputted, it may operate as a voice recognition key. Hereinafter, it is assumed that the key is a voice recognition key.

The course menu 293 is set by a daily course key 233*a*, a hygiene course key 233*b*, and a custom course key 233*c*. Any one of the course menu may be selected and, in some cases, a plurality of the course menus may be set to overlap. For example, an old stains course may be set to the standard washing course.

In addition, the setting menu 297 displays items set by the function setting key 234, 235*a* to 235*d*, and 237*a* to 237*d*. The setting of washing, rinsing, dewatering, and water temperature is displayed, and the washing time is displayed on a washing time display unit 296. In addition, a currently progressing operation is displayed in the setting menu, and the Internet connection state of the laundry treating apparatus 201 is displayed as an Internet icon 298.

When a voice recognition key 234 is set, a voice recognition icon 295 of the setting menu 297 is displayed.

When the voice recognition key 234 is selected, a lamp 294 is turned on so that the voice command of user can be received. When the voice recognition key is set, voice recognition can be accomplished even when the laundry treating apparatus 201 is turned off.

When the voice recognition key is set, the laundry treating apparatus 201 may receive a ringing tone or a user command in a state where the power is turned off, and may output a corresponding guidance announcement or turn on the power to set the operation.

When the voice recognition key 234 is released, the voice command of user cannot be recognized.

Figure 12:
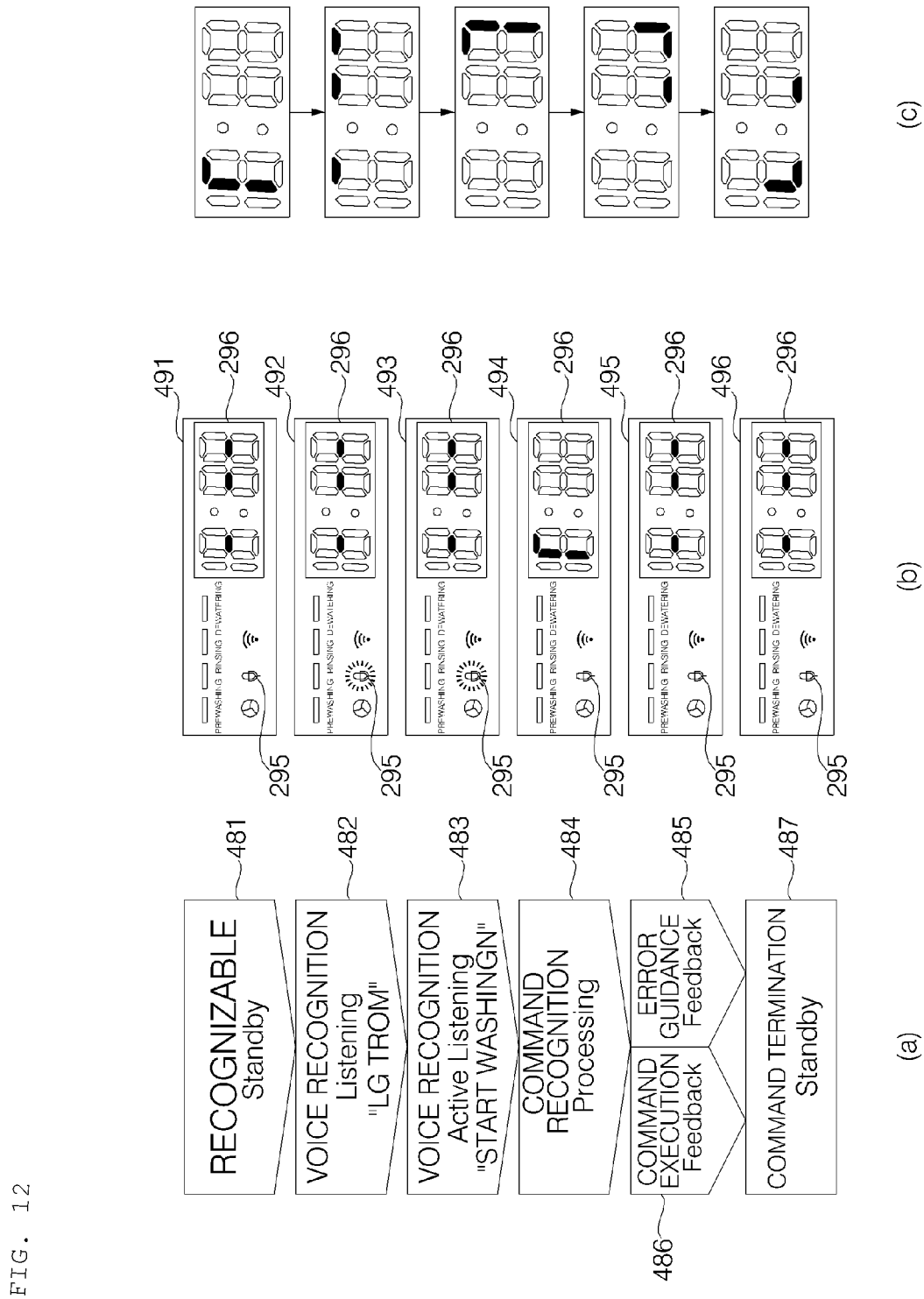
FIG. 12 is an exemplary diagram illustrating a display for each voice recognition step of a laundry treating apparatus according to an embodiment of the present invention.

FIG. 12 is an exemplary diagram illustrating a display for each voice recognition step of a laundry treating apparatus according to an embodiment of the present invention.

FIG. 12A is a flowchart illustrating a voice recognition step, and FIG. 12B is a diagram illustrating a display change for each step of FIG. 12A. FIG. 12C is a diagram illustrating a display change during voice recognition.

As shown in FIGS. 12A to 12C, when the voice recognition key 234 is inputted, it becomes a voice recognition standby state (481). At this time, the voice recognition icon 295 is lit in the setting menu 297 (491).

The controller 240 displays the lighting state of the voice recognition icon 295 differently according to the voice recognition state.

When a user inputs a certain voice command (482), the voice recognition icon 295 is flickered at a first time interval (492). The laundry treating apparatus may recognize the ringing tone.

When a voice command is continuously inputted (483), it is recognized as a voice command and the voice recognition icon 295 is flickered at a second time interval (493). The voice command for the operation setting subsequent to the ringing tone is recognized.

With respect to the inputted voice command, the laundry treating apparatus 201 transmits a voice command as voice data to the voice recognition system 100. While the command is recognized through the voice recognition system (484), the voice recognition icon 295 maintains the lighting state, and further, an animation is displayed on the washing time display unit 296 (494).

In this case, the displayed animation is shown in FIG. 12C. When a lit position is changed at a certain time interval, a certain image may be outputted to indicate that it is in progress. According to the command recognition, for example, a part of the washing time display unit may be sequentially lit to draw a circle shape. In addition, the time may be counted by displaying a certain number or character. The animation may display a progress state by a combination of at least one of a character, a number, an icon, and an image.

When a control signal is received as voice recognition is completed by the voice recognition system 100 and the home appliance control server, the laundry treating apparatus 201 performs a command according to the control signal (485). In the setting menu 297, the display of the animation of the washing time display unit 296 is stopped, and the lighting state of the voice recognition icon 295 is maintained (495).

Further, the laundry treating apparatus 201 may guide an error when there is a failure (486).

A guidance announcement for the result of the performance may be outputted through the audio output unit 291.

When the processing of the inputted voice command is completed, the laundry treating apparatus 201 is switched to a standby state (487). Since the voice recognition setting is maintained, the voice recognition icon 295 maintains the lighting state (496).

Figure 13:
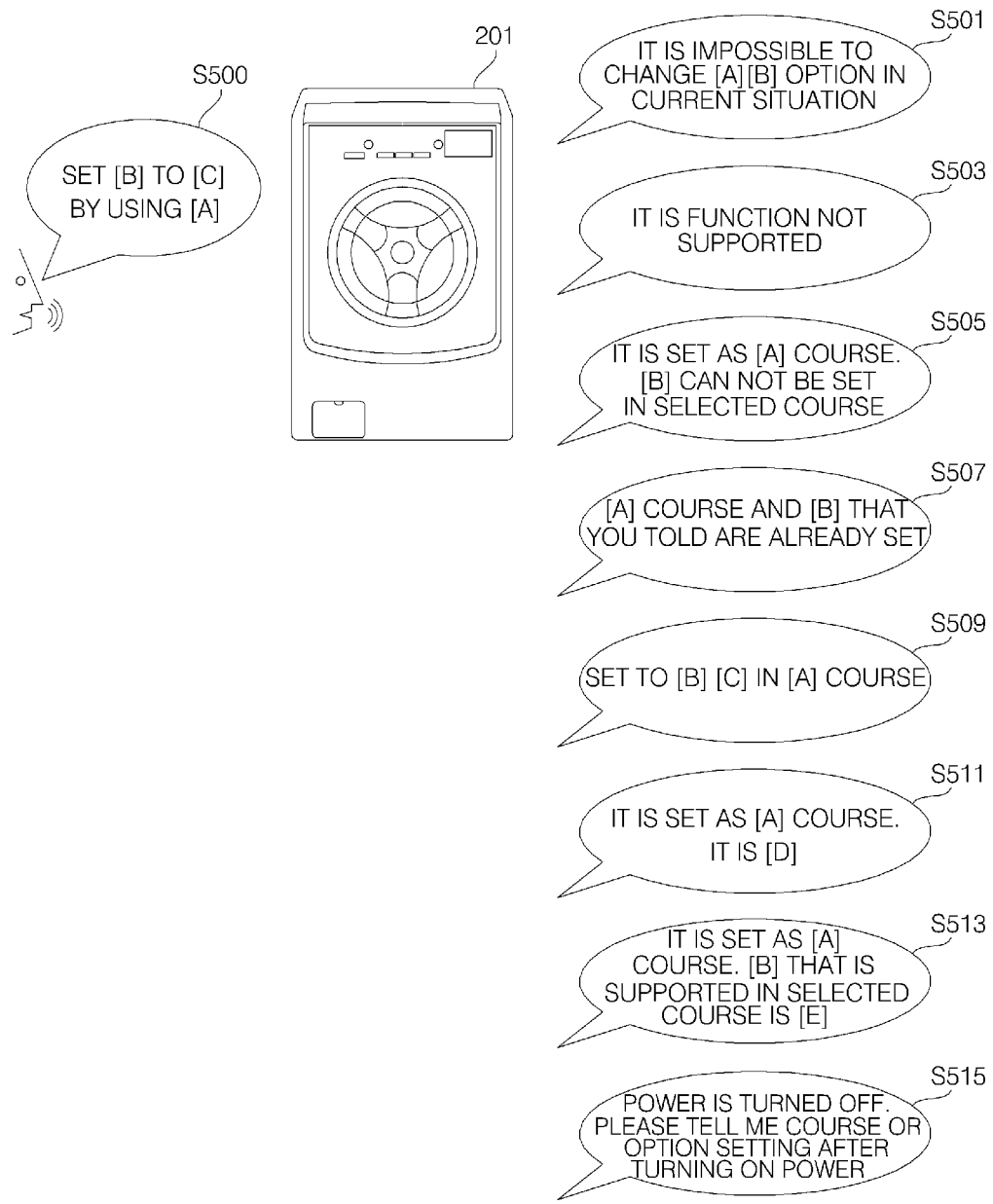
FIG. 13 is an exemplary diagram for explaining the operation of a laundry treating apparatus according to an embodiment of the present invention.

FIG. 13 is an exemplary diagram for explaining the operation of a laundry treating apparatus according to an embodiment of the present invention.

As shown in FIG. 13, in response to the voice command of user, the laundry treating apparatus 201 sets an operation or outputs a corresponding guidance announcement.

The user may input the setting for washing by voice command.

When the user inputs a voice command for a washing course A, an option type B, and an option C (S500), the laundry treating apparatus 201 recognizes the washing course, the option type, and the option to set operation, or outputs a guidance announcement according to the current operation state or supportability.

When outputting the guidance announcement, the laundry treating apparatus 201 outputs a guidance announcement for the washing course A, the option type B, and the option C included in the voice command of user.

For example, a user can input a voice command in a natural language such as 'Set water temperature as cold water in standard washing course'.

At this time, the laundry treating apparatus 201 may recognize the washing course A as 'standard washing', the option type B as 'water temperature', and the option C as 'cold water' through the voice recognition system 100.

In addition, the voice recognition system 100 may analyze the voice command to determine the intention of a user who intends to set the operation. The home appliance control server applies a control signal based on the recognition result and the current state of the laundry treating apparatus 201, or transmits a response signal for the voice command.

Accordingly, when a current operation is previously set and unable to be changed, the laundry treating apparatus 201 may output a guidance announcement such as 'Standard washing and water temperature option cannot be changed in current state' (S501).

When the setting recognized through the voice command is a function that is not supported, the laundry treating apparatus 201 may output a guidance announcement such as 'It is function not supported', with respect to the voice command such as water temperature 100 degrees (S503).

Further, with respect to the washing course A, the option type B, and the option C, when a washing course is able to be set, but the option has a problem, for example, in the case of a washing course having a specified water temperature, the laundry treating apparatus 201 outputs a guidance announcement indicating that the water temperature cannot be changed.

After setting the washing course, the laundry treating apparatus 201 may output a guidance announcement such as 'It is set as cold water washing course. Water temperature cannot be set in selected course' (S505).

When the inputted voice command is the same as a preset operation setting, the laundry treating apparatus 201 may output a guidance announcement such as 'Standard washing course and water temperature that you told are already set' (S507).

Further, when the inputted voice command is able to be set, the laundry treating apparatus 201 may output a guidance announcement such as 'Set water temperature to cold water in standard washing course', after completing the operation setting (S509).

The laundry treating apparatus 201 may set a washing course according to the inputted voice command, and may output a guidance announcement for the content of conflict D when there is a conflict with other setting (S511). For example, the laundry treating apparatus 201 may output a guidance announcement relating to the course setting and the collision between the course and the option such as 'Functional apparel course is set. Steam setting is not available in functional apparel course'.

When there is an option conflict or an option is not set in the voice command, the laundry treating apparatus 201 may output a list E that can be set for the option as a guidance announcement (S513). For example, the laundry treating apparatus 201 may output a selectable list as a guidance announcement such as 'Functional apparel course is set. In the selected course, water temperature is 'cold water' and '30 degrees'.

Meanwhile, when the power is turned off, the laundry treating apparatus 201 may output a guidance announcement such as 'Power is turned off. Please tell me course or option setting after turning on power' (S515). In this case, a user may input a power key or input a new voice command such as 'power on'.

The voice recognition system 100 not only recognizes a voice command by extracting a keyword from the voice command of user, but also enables various changeable endings of word to be recognized without being limited to a designated word.

For example, with respect to a voice command 'Power on', the voice recognition system 100 processes the variant part of user's tone, dialect, etc. such as 'Please power on, turn power on, turn on power, would you turn on power, etc.' so that those commands are all recognized as the power-on of the laundry treating apparatus.

In setting the washing course, in a case of the standard washing course, all of the voice commands such as standard, standard selection, in standard, standard setting, standard course, and select standard are recognized as a standard washing course.

With respect to the voice command that cannot be recognized, the voice recognition system can build a database separately and analyze the accumulated data to learn a new voice command.

Figure 14:
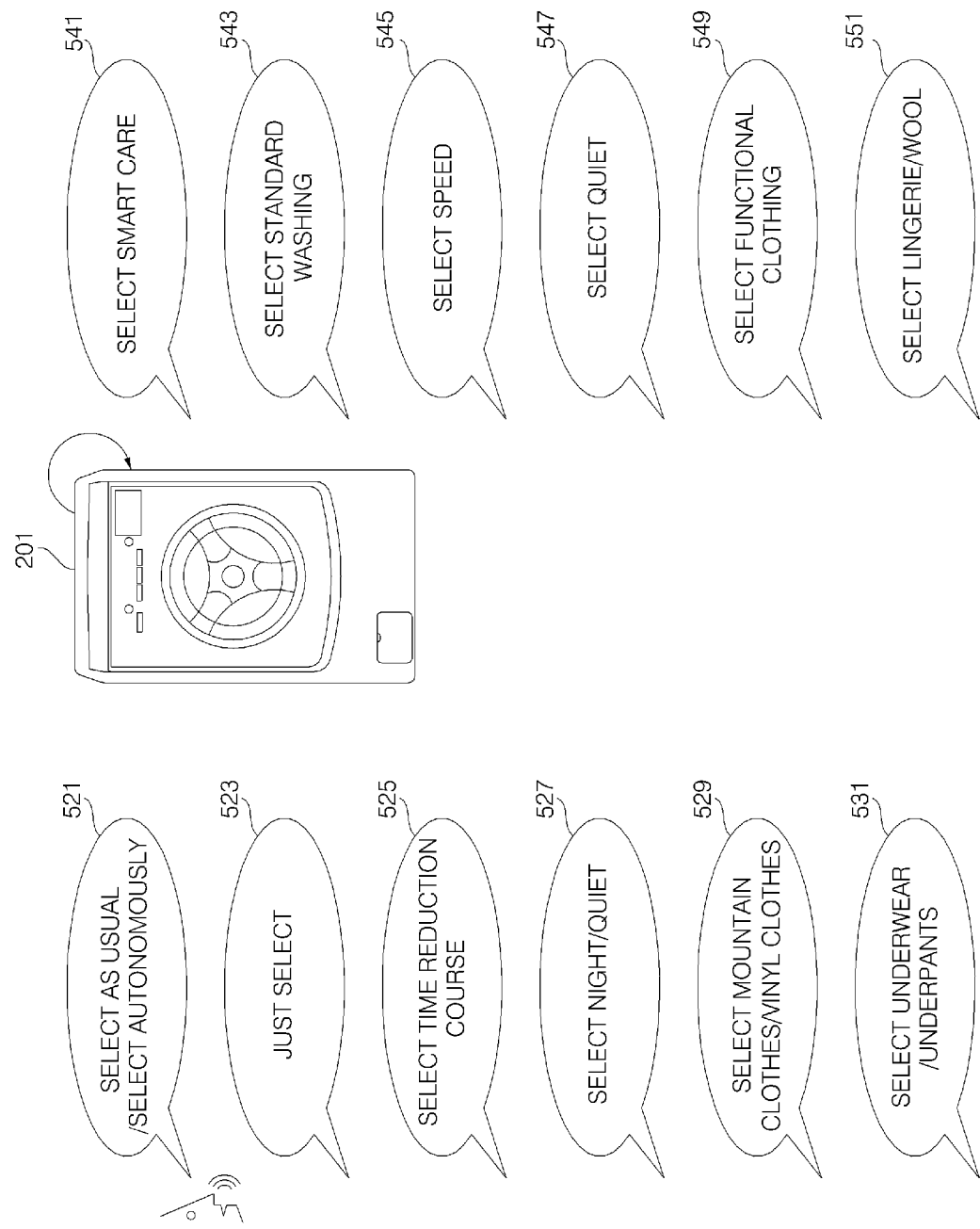
FIG. 14 is an exemplary diagram for explaining a course setting through voice recognition of a laundry treating apparatus according to an embodiment of the present invention.

FIG. 14 is an exemplary diagram for explaining a course setting through voice recognition of a laundry treating apparatus according to an embodiment of the present invention.

As described above, the course of the laundry treating apparatus may be set in addition to the voice command divided into the washing course, the option type, and the option.

As shown in FIG. 14, a course can be set even if a user does not input a specified course name as a voice command.

When the user inputs the voice command 'Select as usual' or 'Select autonomously' (521), the laundry treating apparatus 201 may select a smart care course (541).

The smart care course may set a course by analyzing the course that has been used most frequently in the past one month according to the frequency of use of the course by the user, and also set the washing course by analyzing the type of the inputted fabric.

Further, if the user inputs a voice command 'Just select' (523), the laundry treating apparatus 201 may select a standard washing course which is a basic washing course (543).

When the user inputs a voice command "Select time reduction course" (525), the laundry treating apparatus 201 may select a speed washing course in which total washing time is shortened (545).

When the user inputs a voice command 'Select night' or 'Select quiet' (527), a low noise mode or a quiet mode may be set (547).

When the user inputs a voice command 'Select mountain clothes/vinyl clothes' (529), a 'functional clothing' course may be selected (549).

Further, when the user inputs a voice command 'Select underwear/underpants' (531), the laundry treating apparatus may select a lingerie course or a wool course (551).

As described above, even if it is not the washing course or option type of a designated term, the laundry treating apparatus may analyze the intention of the voice command and set a similar washing course.

Figure 15:
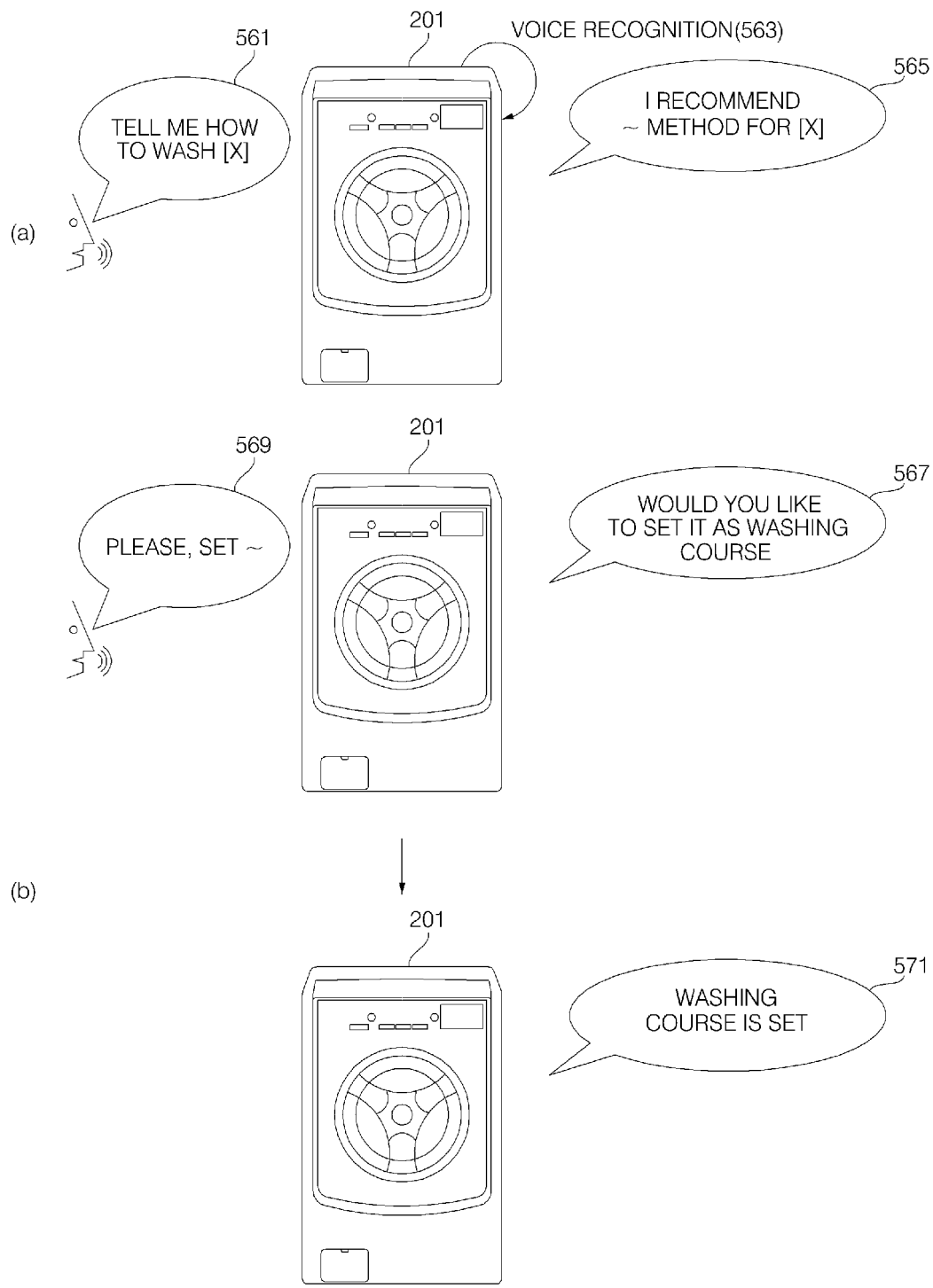
FIG. 15 is an exemplary diagram for explaining a washing guide of a laundry treating apparatus according to an embodiment of the present invention.

FIG. 15 is an exemplary diagram for explaining a washing guide of a laundry treating apparatus according to an embodiment of the present invention.

As shown in FIG. 15A, in response to a washing guide request of user, the laundry treating apparatus may output a guide as a guidance announcement, based on a command and a sound source file recognized through the voice recognition system 100 and the home appliance control server 130.

The user may request the washing method for a guide type X. For example, when a voice command is inputted such as "Tell me how to wash the beer," the laundry treating apparatus recognizes the guide type X and outputs a guide for the guide type X as a guidance announcement. For example, a guidance announcement "For beer or wine, i recommend washing in water, alcohol, and vinegar mixed in 8:1:1 ratio" may be outputted (565).

In addition, when a felt tip pen washing method is requested, a guidance announcement 'For felt tip pen ink, put synthetic detergent in warm water and rub it several times' may be outputted.

As shown in FIG. 15B, for the guided washing guide, when it is possible to set, the laundry treating apparatus 201 may output an additional guidance announcement such as 'Would you like to set it as washing course?' (S567).

When outputting the additional guidance announcement, the laundry treating apparatus 201 waits voice recognition for a certain time and receives the reply of user. When the user inputs a voice command such as 'Please set' (569), the user sets a course according to the suggested washing guide, and then outputs a guidance announcement such as 'Washing course is set' (571).

If the user inputs a voice command such as 'No' or 'I don't need' for the inquiry of the washing course setting, the guidance of washing guide is terminated without setting the washing course.

Meanwhile, in the case of the beer washing method described above, since the suggested mixed liquor cannot be treated in the laundry treating apparatus, it is impossible to set a corresponding additional washing course. Even in the case of a felt-tip pen, it cannot be set as a washing course because it is a part processed by the user.

When it cannot be set as a course, the guidance for washing guide is terminated.

Figure 16:
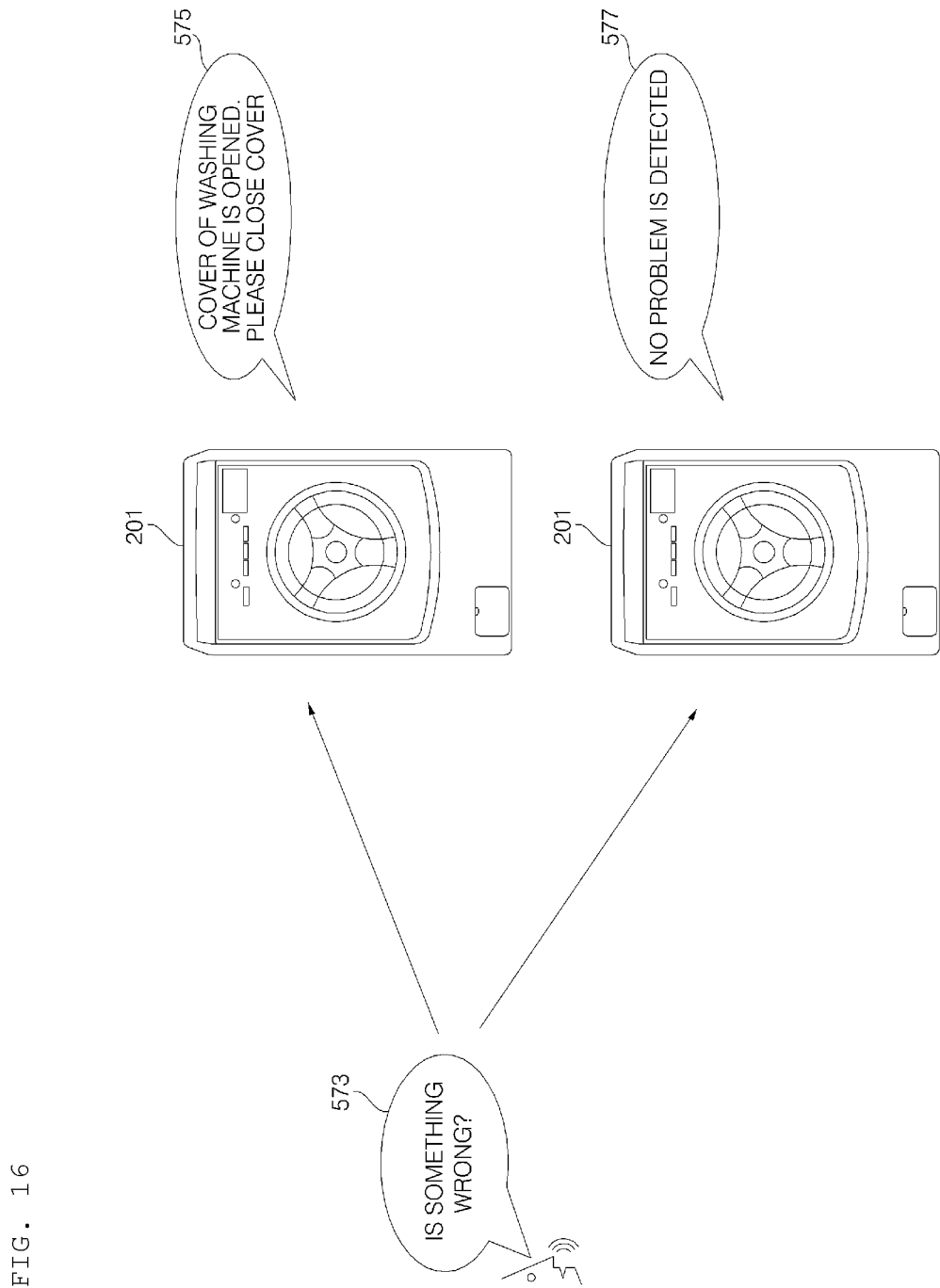
FIGS. 16 and 17 are exemplary diagrams for explaining an error processing of a laundry treating apparatus according to an embodiment of the present invention.
Figure 17:
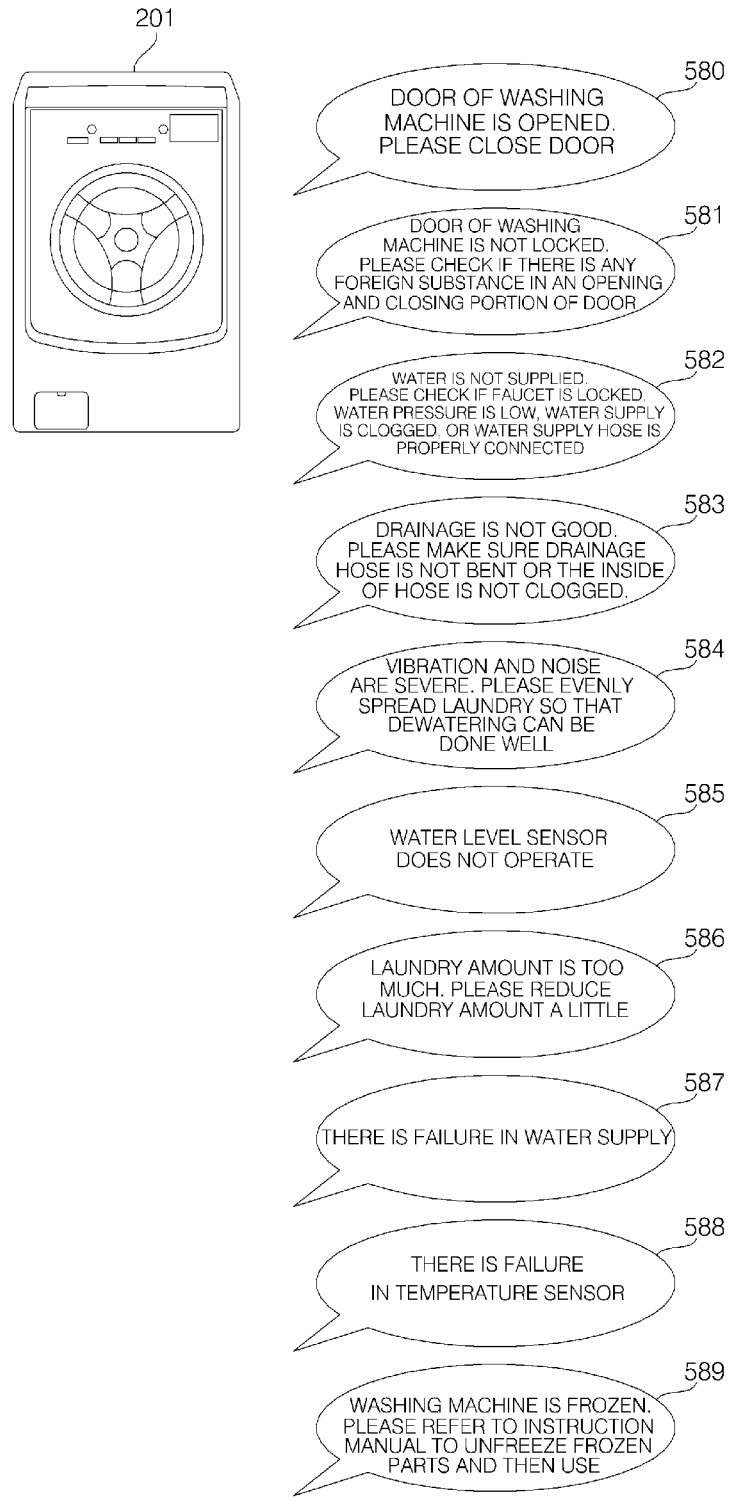

FIGS. 16 and 17 are exemplary diagrams for explaining an error processing of a laundry treating apparatus according to an embodiment of the present invention.

As shown in FIG. 16, when the user inputs a voice command such as 'Is something wrong?', the laundry treating apparatus 201 may receive the result of the intention analysis through the voice recognition system 100, and output a corresponding guidance announcement.

Through the intention analysis that the voice command of 'Is something wrong?' is asking about the current state of the laundry treating apparatus 201 or asking whether an error has occurred, the laundry treating apparatus 201 may output a guidance announcement such as 'Cover of washing machine is opened. Please close cover' or 'No problem is detected'.

In addition, when a failure occurs in the laundry treating apparatus 201, the laundry treating apparatus 201 may output detailed information relating to an error code as a guidance announcement as shown in FIG. 17.

When the voice command of 'Is something wrong?' is inputted from the user, based on the error currently occurred, the laundry treating apparatus 201 may output a guidance announcement such as 'Door of washing machine is opened. Please close door' in relation to a door error (580), or may output a guidance announcement such as 'Door of washing machine is not locked. Please check if there is any foreign substance in an opening and closing portion of door' in relation to a door lock error (581). It is possible to determine and guide the cause of the error in relation to the generated error.

Further, when a water supply error occurs, the laundry treating apparatus 201 may output a guidance announcement such as 'Water is not supplied. Please check if faucet is locked, water pressure is low, water supply is clogged, or water supply hose is properly connected' (582).

The laundry treating apparatus 201 outputs the type of the generated error and the cause of the occurrence of the error as a guide announcement, thereby inducing the user to perform a self-check. In case of drain error, when hose connection or water supply is clogged, since it can be solved by the user without a visit of service engineer, it is necessary to check the cause of error and resolve the error.

In addition, in case of dewatering error, a guide announcement such as 'Vibration and noise are severe. Please evenly spread laundry so that dewatering can be done well' may be outputted so as to solve the problem caused by the tanglement of the laundry, such as the laundry being knotted, twisted or otherwise intertwined (584).

If there is a failure in a water level sensor, a guidance announcement such as 'Water level sensor does not operate' is outputted (585). The laundry treating apparatus 201 may output a guidance announcement such as 'Do you want to apply for AS?' so that user may be guided to proceed with a service application. In addition, if necessary, a telephone number or an access site may be provided so that the service application method can be outputted as a Guidance announcement.

If the laundry is overloaded, a guidance announcement such as 'Laundry amount is too much. Please reduce laundry amount a little' (586). In case of the failure of a water supply valve, a guidance announcement such as 'There is failure in water supply valve' may be outputted (587). In addition, in case of the failure of a temperature sensor, a guidance announcement such as 'There is failure in temperature sensor' may be outputted (588).

In addition, when detecting a freezing, the laundry treating apparatus may output a guidance announcement such as 'Washing machine is frozen. Please refer to instruction manual to unfreeze frozen parts and then use' (589) so as to suggest an error state and a solution.

Figure 18:
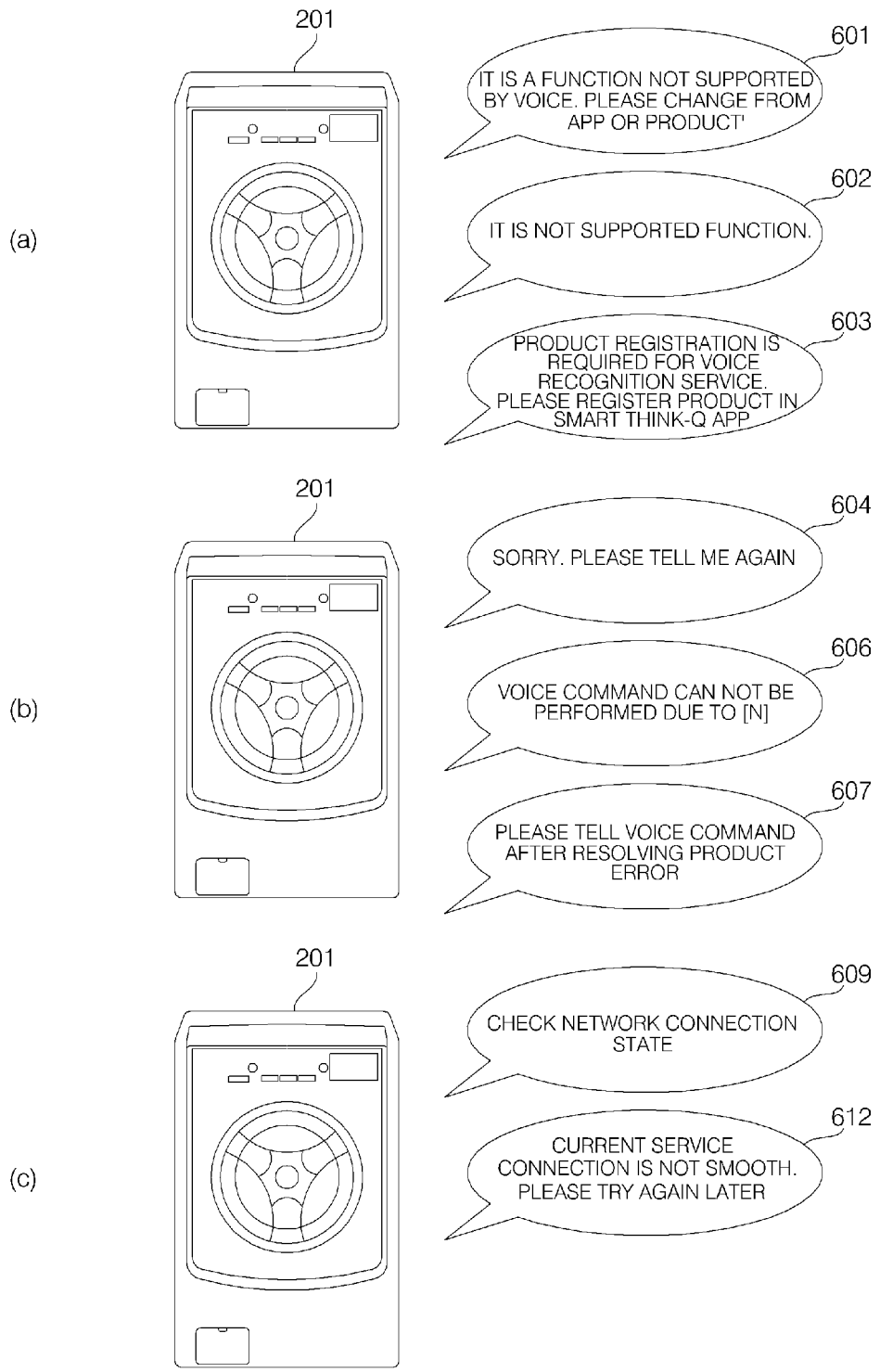
FIG. 18 is an exemplary diagram for explaining a method of guiding the state of a laundry treating apparatus according to an embodiment of the present invention.

FIG. 18 is an exemplary diagram for explaining a method of guiding the state of a laundry treating apparatus according to an embodiment of the present invention.

As shown in FIG. 18A, when it is not possible to support or to set, in different situations, the laundry treating apparatus may output a guidance announcement such as 'It is a function not supported by voice. Please change from App or product' (601) or 'It is not supported function' (602). Further, when the laundry treating apparatus is required to register, the laundry treating apparatus may guide a registration method together. For example, the laundry treating apparatus may output a guidance announcement such as 'Product registration is required for voice recognition service. Please register product in Smart Think-Q App' (603).

When the voice command cannot be recognized as shown in FIG. 18B, a corresponding guidance announcement may be outputted.

The laundry treating apparatus 201 may output a guidance announcement such as 'Sorry. Please tell me again' (604). When the next voice command is unrecognizable, the laundry treating apparatus 201 may output a guidance announcement such as 'I did not understand the word' which is composed of different expressions even in the same situation, i.e., different words with the same meaning.

In addition, when a remote control is not available or a lock is set, a guidance announcement such as 'Voice command cannot be performed due to lock setting N' may be outputted (606). It may be outputted when a child lock or a lock is set. Further, even when it is not possible to set, such a guidance announcement may be outputted during remote control.

When an error is occurred, a guidance announcement such as 'Please tell voice command after resolving product error' may be outputted (607). At this time, it is possible to output the guidance announcement once again for the generated error, and guide to proceed with a service application.

If there is a failure in the network, as shown in FIG. 18C, a guidance announcement such as 'Check network connection state' (609) or 'Current service connection is not smooth. Please try again later' (612) may be outputted.

The laundry treating apparatus 201 may output a guidance announcement corresponding to each of other error situations.

Although an exemplary embodiment of the present invention has been described with reference to a number of illustrative embodiments thereof, it should be understood that numerous other modifications and embodiments may be devised by those skilled in the art that will fall within the spirit and scope of the principles of the invention.

What is claimed is:

1. A home appliance comprising:
an audio input unit including at least one microphone configured to receive a voice command formed of natural language input into the at least one microphone;
a communication unit configured to transmit the voice command to a voice recognition system as voice data, and receive a response signal from the voice recognition system;
a controller configured to:
set an operation corresponding to the response signal,
output a current operation state of the home appliance, and
output a guidance announcement, according to a result of a voice recognition of the voice recognition system; and
an audio output unit configured to output the guidance announcement corresponding to the operation,
wherein the controller is further configured to:
determine whether it is possible to set the operation or to support a function for the operation in response to the response signal and the current operation state of the home appliance,
set the operation to be performed in response to a control signal corresponding to the voice command,
perform the operation, and
output the guidance announcement corresponding to the operation through the audio output unit.

2. The home appliance of claim 1, wherein the controller is further configured to:
receive the control signal from a home appliance control server connected to the voice recognition system, and
request a sound source file for the guidance announcement to the voice recognition system and apply a received sound source file to the audio output unit.

3. The home appliance of claim 2,
wherein the home appliance control server configured to determine an intention of a user for the voice command according to a result of an intention analysis included in the response signal, and
wherein the controller is further configured to: set the operation corresponding to the intention of the user.

4. The home appliance of claim 1, further comprising:
an operation unit including a voice recognition key; and
a display unit configured to output a menu screen and the current operation state of the home appliance,
wherein the controller is further configured to:
set a voice recognition standby mode according to an input of the voice recognition key,
change and output a voice recognition icon displayed on the display unit when the voice command is inputted through the audio input unit in the voice recognition standby mode, and control the display unit to output the current operation state of the home appliance or a progress state in a combination of at least one of a character, a number, an icon, and an image, during voice recognition.

5. The home appliance of claim 1, wherein the controller is configured to output a voice guide for explaining a washing method as the guidance announcement, when a washing guide request is inputted by the voice command.

6. The home appliance of claim 1, wherein the controller is configured to output a guidance announcement formed of different words having the same meaning, when re-outputting the guidance announcement.

7. The home appliance of claim 1, wherein the controller outputs the guidance announcement including an explanation of an error and a countermeasure when the error occurs.

8. The home appliance of claim 1, wherein the voice recognition system comprises:
an automatic speech recognition server which receives the voice data from the home appliance and converts the received voice data into text data;
a natural language processing server which receives the text data from the automatic speech recognition server and analyzes the received text data to determine the voice command; and
a text-to-speech server which converts the response signal based on the voice command into new voice data and transmits the new voice data to the home appliance.

9. A control system comprising:
a home appliance configured to receive a voice command of natural language input to the home appliance;
an automatic speech recognition server configured to receive voice data from the home appliance and convert the received voice data into text data;
a natural language processing server configured to receive the text data from the automatic speech recognition server and analyze the received text data to determine the voice command;
a text-to-speech server configured to convert a response signal based on the voice command into voice data and transmit the voice data to the home appliance; and
a home appliance control server configured to determine whether it is possible to set an operation or to support the operation at the home appliance, in correspondence with data received from the natural language processing server according to the voice command and a current operation state of the home appliance, and transmit a control signal corresponding to the voice command to the home appliance,
wherein the home appliance is configured to set the operation to be performed in response to the control signal received from the home appliance control server, and output a guidance announcement for the operation using a sound source file provided from the text-to-speech server.

10. The control system of claim 9, wherein the home appliance control server is configured to analyze and determine an intention of a user for the voice command, and transmit the control signal to set the operation.

11. The control system of claim 9, wherein the natural language processing server separately classifies and stores voice data that failed in recognition when the voice command is not recognized, and analyzes an accumulated data to learn new voice recognition data.

12. The control system of claim 9, further comprising a service server configured to provide a service,
wherein the home appliance is a laundry treating apparatus, and
wherein the laundry treating apparatus is configured to access the service server in response to the voice command being determined as a request to exclude operation of the laundry treating apparatus and receive data corresponding to the voice command.

13. A method of operating a home appliance, the method comprising the steps of:
inputting a voice command formed of natural language;
transmitting the voice command as voice data to a voice recognition system and receiving a response signal from the voice recognition system;
determining, with respect to an operation corresponding to the voice command, whether it is possible to set the operation or to support a function for the operation, in response to the response signal and a current operation state of the home appliance;
setting and executing the operation, when it is possible to set the operation or support the function for the operation; and
outputting a guidance announcement corresponding to the operation.

14. The method of claim 13, further comprising:
receiving a control signal corresponding to the voice command from a home appliance control server connected to the voice recognition system,
wherein the setting of the operation is in response to the control signal.

15. The method of claim 13, further comprising:
requesting a sound source file from the voice recognition system;
receiving the sound source file; and
applying the received sound source file to an audio output unit to output the guidance announcement.

16. The method of claim 13, further comprising outputting the guidance announcement according to a setting or an impossibility of support, wherein the impossibility of support indicates that it is not possible to set or support the operation.

17. The method of claim 13, further comprising:
standing by an input of the voice command when a voice recognition key is inputted; and
outputting a progress state for a voice recognition process or a processing process of the voice command in a combination of at least one of a character, a number, an icon, and an image, on a display unit of the home appliance, during voice recognition.

18. The method of claim 15, further comprising outputting a guide for explaining a washing method as the guidance announcement, in response to a washing guide request according to the voice command.

19. The method of claim 13, further comprising outputting a guidance announcement formed of different words having the same meaning, when the guidance announcement is re-outputted.

20. A home appliance comprising:
an audio input unit including at least one microphone configured to receive a voice command formed of natural language input into the at least one microphone;
a communication unit configured to transmit the voice command to a voice recognition system as voice data, and receive a response signal from the voice recognition system;
a controller configured to:
set an operation corresponding to the response signal, output a current operation state of the home appliance, and output a guidance announcement, according to a result of a voice recognition of the voice recognition system; and
an audio output unit configured to output the guidance announcement corresponding to the operation,
wherein the controller is further configured to:
  determine whether it is possible to set the operation or to support a function for the operation in response to the response signal and the current operation state of the home appliance,
  perform the operation, and
  output the guidance announcement corresponding to the operation through the audio output unit.

* * * * *